US012129453B2

(12) United States Patent
Bean et al.

(10) Patent No.: US 12,129,453 B2
(45) Date of Patent: Oct. 29, 2024

(54) DETERGENT COMPOSITION COMPRISING DETERSIVE SURFACTANT AND GRAFT POLYMER

(71) Applicant: The Procter & Gamble Company, Cincinnati, OH (US)

(72) Inventors: Jessica Eleanor Bean, Ramstein-Miesenbach (DE); Natalia Becker, Sandhausen (DE); Ouidad Benlahmar, Mannheim (DE); Andreas Buechse, Hochspeyer (DE); Annalaura Del Regno, Mannheim (DE); Peter Joachim Fleckenstein, Ludwigshafen Am Rhein (DE); Katarzyna Gorczynska-Costello, Newcastle Upon Tyne (GB); Frank Huelskoetter, Bad Dürkheim (DE); Kate Moira McLuckie, Hamilton (GB); Jan Ole Mueller, Neuhofen (GB); Volker Settels, Bensheim (DE); Gang Si, Newcastle Upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/884,606

(22) Filed: Aug. 10, 2022

(65) Prior Publication Data

US 2023/0080982 A1 Mar. 16, 2023

(30) Foreign Application Priority Data

Aug. 12, 2021 (EP) .................................... 21191154

(51) Int. Cl.

| | |
|---|---|
| ***C11D 1/00*** | (2006.01) |
| ***C11D 3/00*** | (2006.01) |
| ***C11D 3/22*** | (2006.01) |
| ***C11D 3/37*** | (2006.01) |
| ***C11D 3/386*** | (2006.01) |
| ***C11D 3/395*** | (2006.01) |

(52) U.S. Cl.

CPC .......... *C11D 3/3788* (2013.01); *C11D 3/0021* (2013.01); *C11D 3/222* (2013.01); *C11D 3/3746* (2013.01); *C11D 3/3753* (2013.01); *C11D 3/386* (2013.01); *C11D 3/3955* (2013.01)

(58) Field of Classification Search

CPC ....... C11D 1/00; C11D 3/3707; C11D 3/3746; C11D 3/3757; C11D 3/3788

See application file for complete search history.

(56) References Cited

U.S. PATENT DOCUMENTS

| | | | | |
|---|---|---|---|---|
| 4,746,456 A * | 5/1988 | Kud | C11D 3/0036 | 510/475 |
| 8,784,571 B2 * | 7/2014 | Schutz | C11D 3/3723 | 510/475 |
| 2011/0259365 A1 * | 10/2011 | Schutz | C11D 11/0023 | 510/237 |
| 2017/0081613 A1 * | 3/2017 | Wang | C11D 3/0036 | |
| 2019/0390142 A1 * | 12/2019 | Fossum | C11D 3/3707 | |

FOREIGN PATENT DOCUMENTS

| | | |
|---|---|---|
| EP | 0285037 A2 | 10/1988 |
| WO | 2007138053 A1 | 12/2007 |
| WO | 2020005476 A1 | 1/2020 |

OTHER PUBLICATIONS

Extended European Search Report and Search Opinion; Application No. 21191154.0; dated Jan. 5, 2022; 09 pages.

PCT Search Report and Written Opinion for PCT/US2022/074731 dated Oct. 25, 2022, 13 pages.

* cited by examiner

*Primary Examiner* — Brian P Mruk

(74) *Attorney, Agent, or Firm* — Carrie Schwartz; George H. Leal

(57) ABSTRACT

A detergent composition includes a detersive surfactant and a graft polymer.

11 Claims, No Drawings

DETERGENT COMPOSITION COMPRISING DETERSIVE SURFACTANT AND GRAFT POLYMER

FIELD OF THE INVENTION

The present invention relates to detergent compositions comprising detersive surfactant and novel graft polymers comprising a copolymer backbone (A) as a graft base having polymeric sidechains (B) grafted thereon. The polymeric sidechains (B) are obtainable by polymerization of at least one vinyl ester monomer (B1) and optionally a further monomer (B2), wherein—if present—the weight ratio of monomer (B2) to monomer (B1) is less than 0.5. The polymer backbone (A) is obtainable by polymerization of ethylene oxide, and wherein the molecular weight of the polymer backbone Mn in g/mol is within 500 to 5000.

BACKGROUND OF THE INVENTION

Various states have already introduced initiatives to ban microplastics especially in cosmetic products. Beyond this ban of insoluble microplastic there is an intense dialog on future requirements for soluble polymers used in consumer products. It is therefore highly desirable to identify new better biodegradable ingredients for such applications. This problem is predominantly serious for polymers produced by radical polymerization based on carbon-only backbones (a backbone not containing heteroatoms such as oxygen), since a carbon-only backbone is particularly difficult to degrade for microorganisms. Even radically produced graft polymers of industrial importance with a polyethylene glycol backbone show only limited biodegradation in wastewater. However, the polymers described by the current Invention are preferably produced by radical graft polymerization and provide enhanced biodegradation properties compared to the state-of-the-art.

WO 2007/138053 discloses amphiphilic graft polymers based on water-soluble polyalkylene oxides (A) as a graft base and side chains formed by polymerization of a vinyl ester component (B), said polymers having an average of less than one graft site per 50 alkylene oxide units and mean molar masses M of from 3 000 to 100 000. However, WO 2007/138053 does not contain any disclosure in respect of the biodegradability of the respective graft polymers disclosed therein, as backbones only "water-soluble polyalkylene oxides" are specified.

WO 03/042262 relates to graft polymers comprising (A) a polymer graft skeleton with no mono-ethylenic unsaturated units and (B) polymer sidechains formed from copolymers of two different mono-ethylenic unsaturated monomers (B1) and (B2), each comprising a nitrogen-containing heterocycle, whereby the proportion of the sidechains (B) amounts to 35 to 55 wt.-% of the total polymer. However, the graft polymers according to WO 03/042262 are not based on vinyl ester monomers within the respective polymer sidechains grafted onto the backbone. Beyond that, WO 03/042262 does not have any disclosure in connection with the biodegradability of the graft polymers disclosed therein.

U.S. Pat. No. 5,318,719 relates to a novel class of biodegradable water-soluble graft copolymers having building, anti-filming, dispersing and threshold crystal inhibiting properties comprising (a) an acid functional monomer and optionally (b) other water-soluble, monoethylenically unsaturated monomers copolymerizable with (a) grafted to a biodegradable substrate comprising polyalkylene oxides and/or polyalkoxylated materials. However, U.S. Pat. No. 5,318,719 requires that the respective sidechain of said graft polymers mandatorily comprises a high amount of acid-functional monomers such as acrylic acid or methacrylic acid. Such type of acid monomers are not useful within the context of the present invention.

US 2019/0390142 relates to fabric care compositions that include a graft copolymer, which may be composed of (a) a polyalkylene oxide, such as polyethylene oxide (PEG); (b) N-vinylpyrrolidone (VP); and (c) a vinyl ester, such as vinyl acetate. However, US 2019/0390142 does not disclose a backbone as presently required, nor any biodegradability; all examples disclose only polyethylene oxides as backbone.

WO2020/005476 discloses a fabric care composition comprising a graft copolymer and a so-called treatment adjunct, the graft copolymer comprising a polyalkylene oxide as backbone based on ethylene oxide, propylene oxide, or butylene oxide, preferably polyethylene oxide, and N-vinylpyrrolidone and vinyl ester as grafted side chains on the backbone and with backbone and both monomers in a certain ratio. Explicitly disclosed however are only polyethylene oxides as backbone.

WO2020/264077 discloses cleaning compositions containing a combination of enzymes with a polymer such composition being suitable for removal of stains from soiled material.

This publication discloses a so-called "suspension graft copolymer" which is selected from the group consisting of poly (vinylacetate)-g-poly (ethylene glycol), poly(vinylpyrrolidone)-poly(vinyl acetate)-g-poly(ethylene glycol), and combinations thereof. The backbone however is not as required by the present invention.

WO0018375 discloses pharmaceutical compositions comprising a graft polymers obtained by polymerization of at least one vinyl ester of aliphatic C1-C24-carboxylic acids in the presence of polyethers, with the vinyl ester preferably being vinyl acetate. In the most preferred version the graft polymer is prepared from grafting vinyl acetate on PEG of Mw 6000 g/mol and thereafter hydrolyzing the vinyl acetate to the alcohol (which would then resemble a polymer being obtained from the hypothetical monomer "vinyl alcohol"). Main use is the formation of coatings and films on solid pharmaceutical dosage forms such as tablets etc.

As polymer backbones in WO0018375 poly ethers having a number average molecular weight in the range below 500000, preferably in the range from 300 to 100000, particularly preferably in the range from 500 to 20000, very particularly preferably in the range from 800 to 15000 g/mol are disclosed. It is further mentioned as advantageous to use homopolymers of ethylene oxide or copolymers with an ethylene oxide content of from 40 to 99% by weight and thus a content of ethylene oxide units in the ethylene oxide polymers preferably being employed from 40 to 100 mol %. Suitable as comonomers for these copolymers are said to be propylene oxide, butylene oxide and/or isobutylene oxide, with suitable examples being said to be copolymers of ethylene oxide and propylene oxide, copolymers of ethylene oxide and butylene oxide, and copolymers of ethylene oxide, propylene oxide and at least one butylene oxide. The ethylene oxide content in the copolymers is stated to be preferably from 40 to 99 mol %, the propylene oxide content from 1 to 60 mol % and the butylene oxide content in the copolymers from 1 to 30 mol %. Not only straight-chain but also branched homo- or copolymers are said to be usable as grafting base for the grafting.

Exemplified however are in WO0018375 only PEG 6000 and 9000, a "polyethylene glycol/polypropylene glycol block copolymer" (with average molecular weight "about 8000") and "polyglycerol" (with average molecular weight "2200") (all in g/mol). Five examples only employ vinyl acetate, and only one example employs vinylacetate and methyl methacrylate as monomers. No other monomers are exemplified. All examples employ as final step the hydrolysis of the polymerized vinyl acetate monomer.

Hence, no polymer is being produced and characterized in WO0018375 containing non-hydrolyzed vinyl acetate as claimed in the present invention.

Also, no specific graft polymer is being disclosed nor claimed in WO0018375 being made from poly alkylene oxide polymers other than PEG as polymer backbone The disclosure as such focuses on different compositions comprising only PEGs, grafted with vinyl acetate and then hydrolyzed to vinyl alcohols for use as film-forming polymers in pharmaceutical applications.

Also not disclosed in WO0018375 is the use of such polymers as disclosed herein for detergent and cleaning or fabric care applications. No such application or uses are mentioned at all in this disclosure.

SUMMARY OF THE INVENTION

An object of the present invention is to provide detergent compositions comprising detersive surfactant and novel graft polymers. Furthermore, these novel graft polymers can have beneficial properties in respect of biodegradability and/or their washing behavior, when being employed within compositions such as cleaning compositions.

This object can be achieved by a detergent composition comprising detersive surfactant and graft polymer comprising: (A) 20 to 95%, of a polymer backbone as a graft base, which is obtainable by polymerization of ethylene oxide, wherein the molecular weight of the polymer backbone Mn in g/mol is within 500 to 5000, and (B) 5 to 80% of polymeric sidechains (B) grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5 (with all percentages as weight percent in relation to the total weight of the graft polymer).

DETAILED DESCRIPTION OF THE INVENTION

Graft polymers as described herein may be used, for example, within detergent compositions, such as cleaning compositions and/or fabric and home care products. They can lead to an at least comparable and preferably even improved anti redeposition and cleaning performance within such compositions or products, for example in respect of redeposition of soils and removing of stains, compared to corresponding polymers or graft polymers according to the prior art. Beyond that, the graft polymers according to the present invention lead to an improved biodegradability when being employed within such compositions or products, for example within cleaning compositions and/or fabric and home care products.

Graft polymers with enhanced biodegradation can be used advantageously in washing and cleaning compositions, where they support inter alia the removal of hydrophobic soils from textile or hard surfaces by the surfactants and thus improve the washing and cleaning performances of the formulations. Moreover, they bring about better dispersion of the removed soil in the washing or cleaning liquor and prevent its redeposition onto the surfaces of the washed or cleaned materials.

As used herein, the articles "a" and "an" when used in a claim, are understood to mean one or more of what is claimed or described. As used herein, the terms "include(s)" and "including" are meant to be non-limiting.

The compositions of the present disclosure can "comprise" (i.e. contain other ingredients), "consist essentially of" (comprise mainly or almost only the mentioned ingredients and other ingredients in only very minor amounts, mainly only as impurities), or "consist of" (i.e. contain only the mentioned ingredients and in addition may contain only impurities not avoidable in an technical environment, preferably only the ingredients) the components of the present disclosure.

Similarly, the terms "substantially free of . . . " or "substantially free from . . . " or "(containing/comprising) essentially no . . . " may be used herein; this means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or even less than 0.1%, or even more less than 0.01%, or even 0%, by weight of the composition.

The term "about" as used herein encompasses the exact number "X" mentioned as e.g. "about X %" etc., and small variations of X, including from minus 5 to plus 5% deviation from X (with X for this calculation set to 100%), preferably from minus 2 to plus 2%, more preferably from minus 1 to plus 1%, even more preferably from minus 0.5 to plus 0.5% and smaller variations. Of course, if the value X given itself is already "100%" (such as for purity etc.) then the term "about" clearly can and thus does only mean deviations thereof which are smaller than "100".

The phrase "fabric care composition" is meant to include compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein and detailed herein below when describing the compositions. Such compositions may be used as a pre-laundering treatment, a post-laundering treatment, or may be added during the rinse or wash cycle of the laundering operation, and as further detailed herein below when describing the use and application of the inventive graft polymers and compositions comprising such graft polymers.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure. In all embodiments of the present disclosure, all percentages are by weight of the total composition, unless specifically stated otherwise. All ratios are weight ratios, unless specifically stated otherwise.

Graft Polymers

Included herein is a graft polymer comprising:

(A) 20 to 95%, preferably 30 to 90%, more preferably 40 to 85%, most preferably 50 to 80% of a polymer backbone as a graft base,
    which is obtainable by polymerization of ethylene oxide,
    wherein the molecular weight of the polymer backbone Mn in g/mol is within 500 to 5000, preferably not more than 3500, more preferably not more than 3000, even more preferably not more than 2500, and most preferably not more than 2000, such as not more than 1800, and
(B) 5 to 80%, preferably 10 to 70%, more preferably 15 to 60%, most preferably 20 to 50%, of polymeric sidechains (B) grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5, preferably less than 0.4, more preferably less than 0.3, even more preferably less than 0.2, and most preferably less than 0.1, and—most preferably—essentially no monomer(s) (B2) are present.

(with all percentages as weight percent in relation to the total weight of the graft polymer).

The ratio of the polymer backbone (A) versus the polymeric side chains (B) within the graft polymers as exemplified may not be limited to specific values; any ratio known to a person skilled in the art can in principle be employed. However, good results are obtained when using the ratios as detailed before.

Polymer backbones (A) as such are known to a person skilled in the art as well as methods for producing such copolymers backbones. Such methods are typically the polymerization of ethylene oxide using known means.

Hence, suitable polymer backbones (A) to be employed can be obtained easily by standard alkoxylation polymerization processes employing ethylene oxide.

Also included herein is a graft polymer comprising:

(A) a polymer backbone as a graft base, which is obtainable by polymerization of ethylene oxide,
and
(B) polymeric sidechains grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5, preferably less than 0.4, more preferably less than 0.3, even more preferably less than 0.2, and most preferably less than 0.1, and Wherein the product of formula $$P = [\text{molecular weight of the polymer backbone } Mn \text{ in g/mol}] \times [\text{percentage of amount of polymeric sidechains } (B) \text{ based on total polymer weight, with polymer weight being set to "1" and the percentage of amount of } (B) \text{ as fraction thereof}]$$

is in the range of from 50 to 1500, preferably not more than 1200, more preferably not more than 1000, even more preferably not more than 800, and most preferably not more than 600 such as not more than 400, or even not more than 300, and preferably at least 100, and more preferably at least 120.

The graft polymers preferably have a low polydispersity.

It is preferred that the graft polymer of the invention and/or as detailed before has a polydispersity $M_w/M_n$ of <5, preferably <3.5, more preferably <3, and most preferably in the range from 1.0 to 2.5 (with $M_w$=weight average molecular weight and $M_n$=number average molecular weight; with polydispersity being without unit $[^g/_{mol}/^g/_{mol}]$). The respective values of $M_w$ and/or $M_n$ can be determined as described within the experimental section below.

In respect of the graft polymer of the previous embodiments and/or as detailed before, it is further preferred that monomer (B2) is not employed for the polymerization to obtain the side chains (B).

The polymer backbone (A) contained within the graft polymer and/or as detailed before may either be capped or not capped (uncapped) at the respective end-groups of the backbone. By consequence, it is possible that the copolymer backbone (A) is optionally capped at one or both end-groups, preferably the copolymer backbone (A) is not capped at both end-groups. Capping is done by C1-C25-alkyl groups, preferably C1 to C4-groups.

In respect of the polymeric sidechains (B) contained within the graft polymer, it is preferred that the polymeric sidechains (B) are obtained by radical polymerization of at least one vinyl ester monomer (B1).

As vinyl ester monomer (B1) at least one of vinyl acetate, vinyl propionate and vinyl laurate is selected. Besides the mentioned at least one vinyl ester monomer (B1) further vinyl ester monomers (B1) may be employed which are known to a person skilled in the art, such as vinyl valerate, vinyl pivalate, vinyl neodecanoate, vinyl decanoate and/or vinyl benzoate.

However, in a preferred embodiment, the graft polymer of the invention and/or as detailed before comprises polymeric sidechains (B) which are obtained or obtainable by radical polymerization of the at least one vinyl ester monomer (B1) and optionally at least one other monomer (B2), in the presence of the polymer backbone (A), wherein at least 10 weight percent of the total amount of vinyl ester monomer (B1) is selected from vinyl acetate, vinyl propionate and vinyl laurate, more preferably from vinyl acetate and vinyl laurate, and most preferably vinyl acetate, and wherein the remaining amount of vinyl ester may be any other known vinyl ester, wherein preferably at least 60, more preferably at least 70, even more preferably at least 80, even more preferably at least 90 weight percent, and most preferably essentially only (i.e. about 100 wt. % or even 100 wt. %) vinyl acetate is employed as vinyl ester (weight percent being based on the total weight of vinyl ester monomers B1 being employed), and wherein preferably essentially no other monomer (B2) is employed.

Even more so, in an even more preferred embodiment, the graft polymer of the invention and/or as detailed before comprises (A) 20 to 95%, preferably 30 to 90%, more preferably 40 to 85%, most preferably 50 to 80% of a polymer backbone as a graft base,
    which is obtainable by polymerization of ethylene oxide,
    wherein the molecular weight of the polymer backbone Mn in g/mol is within 500 to 5000, preferably not more than 3500, more preferably not more than 3000, even more preferably not more than 2500, and most preferably not more than 2000, such as not more than 1800, and (B) 5 to 80%, preferably 10 to 70%, more preferably 15 to 60%, most preferably 20 to 50%, of polymeric sidechains (B) grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5, preferably less than 0.4, more preferably less than 0.3, even more preferably less than 0.2, and most preferably less than 0.1, (with all percentages as weight percent in relation to the total weight of the graft polymer), wherein at least 10 weight percent of the total amount of the at least one vinyl ester monomer (B1) is selected from vinyl acetate, vinyl propionate and vinyl laurate, more preferably from vinyl acetate and vinyl laurate, and most preferably vinyl acetate, and wherein the remaining amount of vinyl ester may be any other known vinyl ester, wherein preferably at least 60, more preferably at least 70, even more preferably at least 80, even more preferably at least 90 weight percent, and most preferably essentially only (i.e. about 100 wt. % or even 100 wt. %) vinyl acetate is employed as vinyl ester (weight percent being based on the total weight of vinyl ester monomers B1 being employed), and wherein—more preferably—essentially no other monomer (B2) is employed.

In an alternative (to the preceding embodiment) more preferred embodiment, the graft polymer of the invention and/or as detailed before comprises (A) a polymer backbone as a graft base (A), which is obtainable by polymerization of ethylene oxide, and (B) polymeric sidechains grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5, preferably less than 0.4, more preferably less than 0.3, even more preferably less than 0.2, and most preferably less than 0.1, and Wherein the product of formula $P$=[molecular weight of the polymer backbone $Mn$ in g/mol]×[percentage of amount of polymeric sidechains ($B$) based on total polymer weight, with polymer weight being set to "1" and the percentage of amount of ($B$) as fraction thereof]

Is in the range of from 50 to 1500, preferably not more than 1200, more preferably not more than 1000, even more preferably not more than 800, and most preferably not more than 600 such as not more than 400, or even not more than 300, and preferably at least 100, and more preferably at least 120, wherein at least 10 weight percent of the total amount of the at least one vinyl ester monomer (B1) is selected from vinyl acetate, vinyl propionate and vinyl laurate, more preferably from vinyl acetate and vinyl laurate, and most preferably vinyl acetate, and wherein the remaining amount of vinyl ester may be any other known vinyl ester, wherein preferably at least 60, more preferably at least 70, even more preferably at least 80, even more preferably at least 90 weight percent, and most preferably essentially only (i.e. about 100 wt. % or even 100 wt. %) vinyl acetate is employed as vinyl ester (weight percent being based on the total weight of vinyl ester monomers B1 being employed), and wherein—more preferably—essentially no other monomer (B2) is employed.

The graft polymers of the invention may contain a certain amount of ungrafted polymers ("ungrafted side chains") made of vinyl ester(s), e.g. poly vinyl acetate in case only vinyl acetate is employed, and/or—when further monomers are employed—homo- and copolymers of vinyl ester(s) with the other monomers. The amount of such ungrafted vinyl ester-homo- and copolymers may be high or low, depending on the reaction conditions, but is preferably to be lowered and thus low. By this lowering, the amount of grafted side chains is preferably increased. Such lowering can be achieved by suitable reaction conditions, such as dosing of vinyl ester and radical initiator and their relative amounts and also in relation to the amount of backbone being present. This is generally known to a person of skill in the present field.

The inventive graft polymers maybe characterized by their degree of grafting (number of graft sites of the polymeric sidechains (B) on the polymer backbone (A)). The degree of graft may be high or low, depending on the reaction conditions. Preferably, the degree of grafting is low to medium, more preferably low. "Low" in this aspect means that statistically less than 2 graft sites per 50 alkylene oxide units are present.

This adjustment of the degree of grafting and this amount of ungrafted polymers can be used to optimize the performance in areas of specific interest, e.g. certain (e.g. detergent-) formulations, application areas or desired cleaning etc. performance.

In another—not preferred—embodiment, the polymeric sidechains (B) of the graft polymer according to the are fully or—more preferred—at least partially hydrolyzed after the graft polymer as such is obtained. This means that the full or at least partial hydrolyzation of the polymeric sidechains (B) of the graft polymer is carried out after the polymerization process of the polymeric sidechains (B) is finished.

Due to this full or at least partial hydrolyzation of the polymeric sidechains (B) of the graft polymers, the respective sidechain units originating from the at least one vinyl ester monomer (B1) are changed from the respective ester function into the alcohol function within the polymeric sidechain (B). It has to be noted that the corresponding vinyl alcohol is not suitable to be employed as monomer within the polymerization process of the polymeric sidechains (B) due to stability aspects. In order to obtain an alcohol function (hydroxy substituent) within the polymeric sidechains (B) of the graft polymers, the alcohol function is typically introduced by hydrolyzing the ester function of the sidechains.

From a theoretical point of view, each ester function of the polymeric sidechain (B) may be replaced by an alcohol function (hydroxy group). In such a case, the polymeric sidechain is fully hydrolyzed ("saponified").

The hydrolysis can be carried out by any method known to a person skilled in the art. For example, the hydrolysis can be induced by addition of a suitable base, such as sodium hydroxide or potassium hydroxide.

However, within this embodiment it is preferred that the hydrolyzation of the polymeric sidechains (B) is only carried out partially, for example, to an extend of up to 20 wt. %, 40 wt. % or 60 wt. % (in relation to the total weight of the polymeric sidechains). Even more preferred within this embodiment, the polymeric sidechains (B) are fully or partially hydrolyzed after polymerization, preferably to an extent of up to 50% in relation to the amount of the at least one vinyl ester monomer (B1) employed within the polymerization.

However, in a most preferred embodiment, the polymeric sidechains (B) are not hydrolyzed after polymerization.

It is preferred that in the graft polymers of the invention and/or as detailed before no other monomers besides those as defined above in connection with the at least one vinyl ester monomer (B1) and the optionally present further monomer (B2) are employed within the respective polymerization process for obtaining the polymeric sidechains (B). However, if any further polymeric monomers besides the monomers according to (B1) and optionally (B2) are present, such monomers (other than B1 and B2) are present in an amount of less than 1% of the total amount of monomers employed for obtaining the polymeric sidechains (B). Preferably, the amount of said additional monomers is less than 0.5% by weight, even more preferably less than 0.01% by weight, most preferably, there is a total absence of any additional monomer besides the monomers (B1) and optionally (B2).

In a more preferred embodiment thereof, the weight ratio of monomer (B2) to monomer (B1) is less than 0.5, preferably less than 0.4, more preferably less than 0.3, even more preferably less than 0.2, and most preferably less than 0.1; even more preferably also monomers (B2) are present in an amount of less than 1% of the total amount of monomers employed for obtaining the polymeric sidechains (B). Even more preferably, the amount of monomers (B2) is less than 0.5% by weight, even more preferably less than 0.01% by weight, most preferably, there are essentially no monomers (B2) present besides the monomers (B1).

Monomers (B2) may in principle any monomer polymerizable with vinyl ester-monomers (B1).

It is particularly preferred that no monomers are employed comprising an acid function. In particular, the monomers employed for obtaining the polymeric sidechains (B) of the graft polymers do not comprise any acid-functional monomers such as acrylic acid, methacrylic acid, maleic acid, itaconic acid, crotonic acid, vinyl-acetic acid or acryloxy-propionic acid and the like.

Inventive polymers have at least one of the following properties, preferably two or more, to be successfully employed in the various fields of applications targeted:

a) bio-degradability of a certain level, such bio-degradability of the graft polymer being at least 30, preferably at least 35, even more preferably at least 40% such as at least 45, 50, 55, 60, 65, 70, 75, 80 or 85%, within 28 days when tested under OECD301F (measurement method see experimental section).
b) Water-solubility of the polymers of a certain extent, to be able to employ the polymers within the aqueous environment typically present in the fields of applications. Preferably inventive polymers should exhibit a medium to good, more preferably a very good solubility in the environment of an aqueous formulation as typically employed in such fields for the various kinds of formulations, e.g. dish washing, automatic dishwashing, hard surface cleaning, fabric cleaning, fabric care, cosmetic formulations etc.
c) Viscosities of the polymer solutions should be such that at reasonably high solid concentrations of the polymer as to be handled in and after production and to be provided to the user, which could be e.g. as a “pure” (then typically liquid) product, dissolved in a solvent, typically an aqueous solution containing water and organic solvents, only water or only organic solvents, the viscosity of such polymer or polymer solution being in a range that allows typical technical process steps such as pouring, pumping, dosing etc. Hence, the viscosities should be preferably in a range of about up to less than 4000 mPas, more preferably up to 3500 mPas, even more preferably up to 3000 mPas, such as up to 4500, 3750, 3250, 2750 or even 2600 or below such as 2500, 2000, 1750, 1500, 1250, 1000, 750, 500, 250, 200, 150, or 100 mPas, at concentrations of the polymer (based on the total solid content of the polymer in solution, as defined by weight percent of the dry polymer within the total weight of the polymer solution) of preferably at least 10 wt. %, more preferably at least 20, and even more preferably at least 40 wt. %, and most preferably at least 50 wt. %, such as at least 60, 70, 80 or even 90 wt. %. The viscosity may be measured at either 25° C. or at elevated temperature, e.g. temperatures of 50 or even 60° C. By this a suitable handling of the polymer solutions in commercial scales is possible. It is of course evident that depending on the amount of solvent being added the viscosity is lower when the amount of solvent increases and vice versa, thus allowing for adjustment in case desired. It is also evident that the viscosity being measured depends on the temperature at which it is being measured, e.g. the viscosity of a given polymer with a given solid content of e.g. 80 wt. % will be higher when measured at lower temperature and lower when measured at a higher temperature. In a preferred embodiment the solid content is in between 70 and 99 wt. %, more preferably in between 75 and 85 wt. %, with no additional solvent being added but the polymer as prepared. In a more preferred embodiment, the solid content is in between 70 and 99 wt. %, more preferably in between 75 and 95 wt. %, with no additional solvent being added but the polymer as prepared, and the viscosity is lower than 3000 mPas, more preferably 3250, or even below 2750, 2600, 2500, 2000, 1750, 1500, 1250, 1000, 750, 500 or even 250 mPas, when measured at 60° C. The viscosity may be determined as generally known for such polymers, preferably as described below in the experimental part.

To achieve these requirements, the following guidance can be given on how to achieve such properties of the inventive polymers:

Biodegradability increases generally with at least one of the following conditions:

- lower molecular weight of the polymer backbone (A) compared to higher molecular weight;
- lower weight percentage of polymeric side chains (monomer B) being grafted onto the backbone compared to higher weight percentages.

As further criteria of course the individual performance of a specific polymer needs to be evaluated and thus ranked for each individual formulation in a specific field of application. Due to the broad usefulness of the inventive polymers an exhaustive overview is not possible, but the present specification and examples give a guidance on how to prepare and select useful polymers of desired properties and how to tune the properties to the desired needs. One such criteria for the area of home care and especially fabric care of course it he performance upon washing, e.g. subjecting a certain material exhibiting stains of certain materials to a defined washing procedure.

The examples give some guidance for the application for washing of fabrics, i.e. the general area of fabric care.

Depending on the individual needs for a polymer exhibiting a defined degree of biodegradation, water solubility and viscosity (i.e. handling properties) the general and specific teachings herein—without being intended to be limited to the specific examples being given—will guide on how to obtain such polymer.

Process of Making the Graft Polymer

Additionally included herein is a process for preparing the inventive graft polymers as described above in the various embodiments and variations thereof. Within this process for obtaining at least one graft polymer, at least one monomer (B1) and optionally a further monomer (B2) are polymerized in the presence of at least one polymer backbone (A).

It has to be noted that the grafting process as such, wherein a polymeric backbone, such as a polymer backbone (A), is grafted with polymeric sidechains, is known to a person skilled in the art. Any process known to the skilled person in this respect can be employed.

Within the process, it is preferred that the polymeric sidechains (B) are obtained by radical polymerization.

The radical polymerization as such is also known to a skilled person. The person skilled in the art also knows that the inventive process can be carried out in the presence of a radical-forming initiator (C) and/or at least one solvent (D). The skilled person knows the respective components as such.

The term "radical polymerization" as used herein comprises besides the free radical polymerization also variants thereof, such as controlled radical polymerization. Suitable control mechanisms are RAFT, NMP or ATRP, which are each known to the skilled person, including suitable control agents.

In a preferred embodiment, the process to produce a graft polymer of the invention and/or as detailed before comprises the polymerization of at least one vinyl ester monomer (B1) and optionally at least one further monomer (B2) in the presence of at least one polymer backbone (A), a free radical-forming initiator (C) and, if desired, up to 50% by weight, based on the sum of components (A), (B1), optionally (B2), and (C) of at least one organic solvent (D), at a mean polymerization temperature at which the initiator (C) has a decomposition half-life of from 40 to 500 min, in such a way that the fraction of unconverted graft monomers (B1) and optional monomer (B2) and initiator (C) in the reaction mixture is constantly kept in a quantitative deficiency relative to the copolymer backbone (A). In a preferred embodiment no monomer (B2) is employed.

The amount of ((free) radical-forming) initiator (C) is preferably from 0.1 to 5% by weight, in particular from 0.3 to 3.5% by weight, based in each case on the polymeric sidechains (B).

For the process according to the invention, it is preferred that the steady-state concentration of radicals present at the mean polymerization temperature is substantially constant and the graft monomers (B1) or (B2) are present in the reaction mixture constantly only in low concentration (for example of not more than 5% by weight in total). This allows the reaction to be controlled, and graft polymers can be prepared in a controlled manner with the desired low polydispersity.

The term "mean polymerization temperature" is intended to mean here that, although the process is substantially isothermal, there may, owing to the exothermicity of the reaction, be temperature variations which are preferably kept within the range of +/−10° C., more preferably in the range of +/−5° C.

According to the invention, the (radical-forming) initiator (C) at the mean polymerization temperature should have a decomposition half-life of from 40 to 500 min, preferably from 50 to 400 min and more preferably from 60 to 300 min.

According to the invention, the initiator (C) and the graft monomers (B1) and/or (B2) are advantageously added in such a way that a low and substantially constant concentration of undecomposed initiator and graft monomers (B1) and/or (B2) is present in the reaction mixture. The proportion of undecomposed initiator in the overall reaction mixture is preferably 15% by weight, in particular 10% by weight, based on the total amount of initiator metered in during the monomer addition.

In a more preferred embodiment, the process comprises the polymerization of at least one vinyl ester monomer (B1) and optionally at least one other monomer (B2) in the presence of at least one polymer backbone (A), a free radical-forming initiator (C) and, if desired, up to 50% by weight, based on the sum of components (A), (B1), optional (B2), and (C), of at least one organic solvent (D), at a mean polymerization temperature at which the initiator (C) has a decomposition half-life of from 40 to 500 min, in such a way that the fraction of unconverted graft monomers (B1) and optional (B2) and initiator (C) in the reaction mixture is constantly kept in a quantitative deficiency relative to the polymer backbone (A), wherein preferably at least 10 weight percent of the total amount of vinyl ester monomer (B1) is selected from vinyl acetate, vinyl propionate and vinyl laurate, more preferably from vinyl acetate and vinyl laurate, and most preferably vinyl acetate, and wherein the remaining amount of vinyl ester may be any other known vinyl ester, wherein preferably at least 60, more preferably at least 70, even more preferably at least 80, even more preferably at least 90 weight percent, and most preferably essentially only (i.e. about 100 wt. % or even 100 wt. %) vinyl acetate is employed as vinyl ester (weight percent being based on the total weight of vinyl ester monomers B1 being employed), and wherein—if (B2) is present—the weight ratio of optional monomer (B2) to monomer (B1) is less than 0.5, preferably less than 0.4, more preferably less than 0.3, even more preferably less than 0.2, and most preferably less than 0.1.

In an even more preferred embodiment of the preceding embodiment before, besides the monomer(s) (B1) essentially no monomer (B2) is employed.

The mean polymerization temperature is appropriately in the range from 50 to 140° C., preferably from 60 to 120° C. and more preferably from 65 to 110° C.

Examples of suitable initiators (C) whose decomposition half-life in the temperature range from 50 to 140° C. is from 20 to 500 min are:

O—$C_2$-$C_{12}$-acylated derivatives of tert-$C_4$-$C_{12}$-alkyl hydroperoxides and tert-($C_9$-$C_{12}$-aralkyl) hydroperoxides, such as tert-butyl peroxyacetate, tert-butyl monoperoxymaleate, tert-butyl peroxyisobutyrate, tert-butyl peroxypivalate, tert-butyl peroxyneoheptanoate, tert-butyl peroxy-2-ethylhexanoate, tert-butyl peroxy-3,5,5-trimethylhexanoate, tert-butyl peroxyneodecanoate, tert-amyl peroxypivalate, tert-amyl peroxy-2-ethylhexanoate, tert-amyl peroxyneodecanoate, 1,1,3,3-tetramethylbutyl peroxyneodecanoate, cumyl peroxyneodecanoate, tert-butyl peroxybenzoate, tert-amyl peroxybenzoate and di-tert-butyl diperoxyphthalate;

di-O—$C_4$-$C_{12}$-acylated derivatives of tert-$C_8$-$C_{14}$-alkylene bisperoxides, such as 2,5-dimethyl-2,5-di(2-ethylhexanoylperoxy)hexane, 2,5-dimethyl-2,5-di(benzoylperoxy)hexane and 1,3-di(2-neodecanoylperoxyisopropyl)benzene;

di($C_2$-$C_{12}$-alkanoyl) and dibenzoyl peroxides, such as diacetyl peroxide, dipropionyl peroxide, disuccinyl peroxide, dicapryloyl peroxide, di(3,5,5-trimethylhexanoyl) peroxide, didecanoyl peroxide, dilauroyl peroxide, dibenzoyl peroxide, di(4-methylbenzoyl) peroxide, di(4-chlorobenzoyl) peroxide and di(2,4-dichlorobenzoyl) peroxide;

tert-$C_4$-$C_5$-alkyl peroxy($C_4$-$C_{12}$-alkyl)carbonates, such as tert-amyl peroxy(2-ethyl-hexyl)carbonate;

di($C_2$-$C_{12}$-alkyl) peroxydicarbonates, such as di(n-butyl) peroxydicarbonate and di(2-ethylhexyl) peroxydicarbonate.

Depending on the mean polymerization temperature, examples of particularly suitable initiators (C) are:

at a mean polymerization temperature of from 50 to 60° C.:

tert-butyl peroxyneoheptanoate, tert-butyl peroxyneodecanoate, tert-amyl peroxypivalate, tert-amyl peroxyneodecanoate, 1,1,3,3-tetramethylbutyl peroxyneodecanoate, cumyl peroxyneodecanoate, 1,3-di(2-neodecanoyl peroxyisopropyl)benzene, di(n-butyl) peroxydicarbonate and di(2-ethylhexyl) peroxydicarbonate;

at a mean polymerization temperature of from 60 to 70° C.:

tert-butyl peroxypivalate, tert-butyl peroxyneoheptanoate, tert-butyl peroxyneodecanoate, tert-amyl peroxypivalate and di(2,4-dichlorobenzoyl) peroxide;

at a mean polymerization temperature of from 70 to 80° C.:

tert-butyl peroxypivalate, tert-butyl peroxyneoheptanoate, tert-amyl peroxypivalate, dipropionyl peroxide, dicapryloyl peroxide, didecanoyl peroxide, dilauroyl peroxide, di(2,4-dichlorobenzoyl) peroxide and 2,5-dimethyl-2,5-di(2-ethylhexanoylperoxy)hexane;

at a mean polymerization temperature of from 80 to 90° C.:

tert-butyl peroxyisobutyrate, tert-butyl peroxy-2-ethylhexanoate, tert-amyl peroxy-2-ethylhexanoate, dipropionyl peroxide, dicapryloyl peroxide, didecanoyl peroxide, dilauroyl peroxide, di(3,5,5-trimethylhexanoyl) peroxide, dibenzoyl peroxide and di(4-methylbenzoyl) peroxide;

at a mean polymerization temperature of from 90 to 100° C.:

tert-butyl peroxyisobutyrate, tert-butyl peroxy-2-ethylhexanoate, tert-butyl monoperoxymaleate, tert-amyl peroxy-2-ethylhexanoate, dibenzoyl peroxide and di(4-methylbenzoyl) peroxide;

at a mean polymerization temperature of from 100 to 110° C.:

tert-butyl monoperoxymaleate, tert-butyl peroxyisobutyrate and tert-amyl peroxy(2-ethylhexyl)carbonate;

at a mean polymerization temperature of from 110 to 120° C.:

tert-butyl monoperoxymaleate, tert-butyl peroxy-3,5,5-trimethylhexanoate and tert-amyl peroxy(2-ethylhexyl) carbonate.

Preferred initiators (C) are O—$C_4$-$C_{12}$-acylated derivatives of tert-$C_4$-$C_5$-alkyl hydroperoxides, particular preference being given to tert-butyl peroxypivalate and tert-butyl peroxy-2-ethylhexanoate.

Particularly advantageous polymerization conditions can be established effortlessly by precise adjustment of initiator (C) and polymerization temperature. For instance, the preferred mean polymerization temperature in the case of use of tert-butyl peroxypivalate is from 60 to 80° C., and, in the case of tert-butyl peroxy-2-ethylhexanoate, from 80 to 100° C.

The inventive polymerization reaction can be carried out in the presence of, preferably small amounts of, an organic solvent (D). It is of course also possible to use mixtures of different solvents (D). Preference is given to using water-soluble or water-miscible solvents.

When a solvent (D) is used as a diluent, generally from 1 to 40% by weight, preferably from 1 to 35% by weight, more preferably from 1.5 to 30% by weight, most preferably from 2 to 25% by weight, based in each case on the sum of the components (A), (B1), optionally (B2), and (C), are used.

Examples of suitable solvents (D) include:

monohydric alcohols, preferably aliphatic $C_1$-$C_{16}$-alcohols, more preferably aliphatic $C_2$-$C_{12}$-alcohols, most preferably $C_2$-$C_4$-alcohols, such as ethanol, propanol, isopropanol, butanol, sec-butanol and tert-butanol;

polyhydric alcohols, preferably $C_2$-$C_{10}$-diols, more preferably $C_2$-$C_6$-diols, most preferably $C_2$-$C_4$-alkylene glycols, such as ethylene glycol, 1,2-propylene glycol and 1,3-propylene glycol;

alkylene glycol ethers, preferably alkylene glycol mono ($C_1$-$C_{12}$-alkyl) ethers and alkylene glycol di($C_1$-$C_6$-alkyl) ethers, more preferably alkylene glycol mono- and di($C_1$-$C_2$-alkyl) ethers, most preferably alkylene glycol mono($C_1$-$C_2$-alkyl) ethers, such as ethylene glycol monomethyl and -ethyl ether and propylene glycol monomethyl and -ethyl ether;

polyalkylene glycols, preferably poly($C_2$-$C_4$-alkylene) glycols having 2-20 $C_2$-$C_4$-alkylene glycol units, more preferably polyethylene glycols having 2-20 ethylene glycol units and polypropylene glycols having 2-10 propylene glycol units, most preferably polyethylene glycols having 2-15 ethylene glycol units and polypropylene glycols having 2-4 propylene glycol units, such as diethylene glycol, triethylene glycol, dipropylene glycol and tripropylene glycol;

polyalkylene glycol monoethers, preferably poly($C_2$-$C_4$-alkylene) glycol mono($C_1$-$C_{25}$-alkyl) ethers having 2-20 alkylene glycol units, more preferably poly($C_2$-$C_4$-alkylene) glycol mono($C_1$-$C_{20}$-alkyl) ethers having 2-20 alkylene glycol units, most preferably poly($C_2$-$C_3$-alkylene) glycol mono($C_1$-$C_{16}$-alkyl) ethers having 3-20 alkylene glycol units;

carboxylic esters, preferably $C_1$-$C_8$-alkyl esters of $C_1$-$C_6$-carboxylic acids, more preferably $C_1$-$C_4$-alkyl esters of $C_1$-$C_3$-carboxylic acids, most preferably $C_2$-$C_4$-alkyl esters of $C_2$-$C_3$-carboxylic acids, such as ethyl acetate and ethyl propionate;

aliphatic ketones which preferably have from 3 to 10 carbon atoms, such as acetone, methyl ethyl ketone, diethyl ketone and cyclohexanone;

cyclic ethers, in particular tetrahydrofuran.

The solvents (D) are advantageously those solvents, which are also used to formulate the inventive graft polymers for use (for example in washing and cleaning compositions) and can therefore remain in the polymerization product.

Preferred examples of these solvents are polyethylene glycols having 2-15 ethylene glycol units, polypropylene glycols having 2-6 propylene glycol units and in particular alkoxylation products of $C_6$-$C_8$-alcohols (alkylene glycol monoalkyl ethers and polyalkylene glycol monoalkyl ethers).

Particular preference is given here to alkoxylation products of $C_8$-$C_{16}$-alcohols with a high degree of branching, which allow the formulation of polymer mixtures which are free-flowing at 40-70° C. and have a very low polymer content at comparatively low viscosity. The branching may be present in the alkyl chain of the alcohol and/or in the polyalkoxylate moiety (copolymerization of at least one propylene oxide, butylene oxide or isobutylene oxide unit). Particularly suitable examples of these alkoxylation products are 2-ethylhexanol or 2-propylheptanol alkoxylated with 1-15 mol of ethylene oxide, $C_{13}/C_{15}$ oxo alcohol or $C_{12}/C_{14}$ or $C_{16}/C_{18}$ fatty alcohol alkoxylated with 1-15 mol of ethylene oxide and 1-3 mol of propylene oxide, preference being given to 2-propylheptanol alkoxylated with 1-15 mol of ethylene oxide and 1-3 mol of propylene oxide.

In the process according to the invention, polymer backbone (A), graft monomer (B1) and, if appropriate, (B2), initiator (C) and, if appropriate, solvent (D) are usually heated to the selected mean polymerization temperature in a reactor.

According to the invention, the polymerization is carried out in such a way that an excess of polymer (polymer backbone (A) and formed graft polymer (B)) is constantly present in the reactor. The quantitative ratio of polymer to ungrafted monomer and initiator is generally ≥10:1, preferably ≥15:1 and more preferably ≥20:1.

The polymerization process according to the invention can in principle be carried out in various reactor types.

The reactor used is preferably a stirred tank in which the polymer backbone (A), if appropriate together with portions, of generally up to 15% by weight of the particular total amount, of graft monomers (B1) or (B2), initiator (C) and solvent (D), are initially charged fully or partly and heated to the polymerization temperature, and the remaining amounts of (B), (C) and, if appropriate, (D) are metered in, preferably separately. The remaining amounts of (B), (C) and, if appropriate, (D) are metered in preferably over a period of 2 h, more preferably of 4 h and most preferably of 5 h.

In the case of the particularly preferred, substantially solvent-free process variant, the entire amount of polymer backbone (A) is initially charged as a melt and the graft monomers (B1) and, if appropriate, (B2), and also the initiator (C) present preferably in the form of a from 10 to 50% by weight solution in one of the solvents (D), are metered in, the temperature being controlled such that the selected polymerization temperature, on average during the polymerization, is maintained with a range of especially +/−10° C., in particular +/−5° C.

In a further particularly preferred, low-solvent process variant, the procedure is as described above, except that solvent (D) is metered in during the polymerization in order to limit the viscosity of the reaction mixture. It is also possible to commence with the metered addition of the solvent only at a later time with advanced polymerization, or to add it in portions.

The polymerization can be affected under standard pressure or at reduced or elevated pressure. When the boiling point of the monomers (B1) or (B2) or of any diluent (D) used is exceeded at the selected pressure, the polymerization is carried out with reflux cooling.

Use of the Graft Polymer

In principle the graft polymers of this invention can be employed in any application to replace conventional graft polymers of the same or very similar composition (in terms of relative amounts of polymer backbone and grafted monomers especially when the type and amounts of grafted monomers is similar or comparable. Such applications are for example detergent compositions, including cleaning compositions and/or fabric and home care compositions.

Hence, additionally included herein is the use of the graft polymers of the invention as detailed before in fabric and home care products, in particular cleaning compositions for improved oily and fatty stain removal, removal of solid dirt such as clay, prevention of greying of fabric surfaces, and/or anti-scale agents, wherein the cleaning composition is preferably a laundry detergent formulation and/or a dish wash detergent formulation, more preferably a liquid laundry detergent formulation and/or a liquid manual dish wash detergent formulation.

Detergent compositions, such as laundry detergents, cleaning compositions and/or fabric and home care products as such are known to a person skilled in the art. Any composition etc. known to a person skilled in the art, in connection with the respective use, can be employed.

In a preferred embodiment, it is a cleaning composition and/or fabric and home care product and/or institutional cleaning product, comprising a detersive surfactant and at least one graft polymer as defined above. In particular, it is a cleaning composition, preferably a laundry detergent formulation and/or a manual dish wash detergent formulation, more preferably a liquid laundry detergent formulation and/or a liquid manual dish wash detergent formulation, for improved cleaning performance and/or anti-redeposition, for example in respect of redeposition of soils and removing of stains, in particular for stain removal such as greasy soil covering sebum and food grease, and/or for particulate soil such as clay, preferably a cleaning composition, more preferably a laundry detergent formulation and/or a manual dish wash detergent formulation, most preferably a liquid laundry detergent formulation and/or a liquid manual dish wash detergent formulation, for improved cleaning/primary washing and/or oily and fatty stain removal, more preferably for stain removal of greasy soil covering sebum and food grease, and for particulate soil such as clay.

Specifically, the graft polymer of the invention support the removal of various hydrophobic and hydrophilic soils, such as body soils, food and grease soil, particulate soil such clay or carbon black, grass soil, make-up, motor oil etc. from textile or hard surfaces by the surfactants and thus improve the washing and cleaning performances of the formulations ("improved cleaning performance").

Also, the graft polymers of the invention bring about better dispersion of the removed soil in the washing or cleaning liquor and prevent its redeposition onto the surfaces of the washed or cleaned materials ("anti-redeposition performance"). Herein, the removed soil include all typical soil that exist in the laundry process, for example, body soil, food and grease soil, particulate soil such clay or carbon black, grass soil, make-up, motor oil etc. Such anti-redeposition effect can be observed on various fabric types, including cotton, polycotton, polyester, copolymer of poly ether/poly urea (Spandex™), etc. In addition, such anti-redeposition effect is also effective on fabrics that have a fabric enhancer history, or when the fabric wash is carried out in the presence of fabric enhancer or other laundry additives such as freshness beads or bleach.

In one embodiment it is also preferred that the cleaning composition comprises (besides at least one graft polymer as described above) additionally at least one enzyme, preferably selected from one or more lipases, hydrolases, amylases, proteases, cellulases, hemicellulases, phospholipases, esterases, pectinases, pectate lyases, mannanases, lactases and peroxidases, and combinations of at least two of the foregoing types.

Another subject-matter is, therefore, a cleaning composition such as a fabric and home care product and an institutional cleaning product, comprising at least one graft polymer as defined above, and in particular a cleaning composition for improved cleaning and anti-redeposition performance as detailed before.

At least one graft polymer as described herein is present in said inventive cleaning compositions in an amount ranging from about 0.01% to about 20%, preferably from about 0.05% to 15%, more preferably from about 0.1% to about 10%, and most preferably from about 0.5% to about 5%, in relation to the total weight of such composition or product in relation to the total weight of such composition or product; such cleaning composition may—and preferably does—further comprise a from about 1% to about 70% by weight of a surfactant system.

Preferably, such inventive cleaning composition is a fabric and home care product or an industrial and institutional (I&I) cleaning product, preferably a fabric and home care product, more preferably a laundry detergent or manual dish washing detergent, comprising at least one inventive graft polymer, and optionally further comprising at least one surfactant or a surfactant system, providing improved removal, dispersion and/or emulsification of soils and/or modification of treated surfaces and/or whiteness maintenance of treated surfaces.

Even more preferably, the cleaning compositions comprises at least one inventive graft polymer, and optionally further comprises at least one surfactant or a surfactant system—all as detailed before—and exhibit improved cleaning and anti-redeposition performance within laundry and manual dish wash applications, even more specifically, for improved cleaning and anti-redeposition performance in laundry applications and most preferably in a laundry detergent, and may additionally comprise at least one enzyme selected from the list consisting of lipases, hydrolases, amylases, proteases, cellulases, hemicellulases, phospholipases, esterases, pectinases, lactases and peroxidases, and combinations of at least two of the foregoing types of enzymes.

In one embodiment, the inventive graft polymer may be used for improved cleaning and anti-redeposition and/or additionally for whiteness maintenance, preferably in laundry care. In another preferred embodiment the inventive graft polymer may be used for reducing the greying of fabric (anti-greying), preferably in laundry applications.

In one preferred embodiment, the cleaning composition is a liquid or solid laundry detergent composition.

In another preferred embodiment, the cleaning composition is a liquid or solid (e.g. powder or tab/unit dose) detergent composition for manual or automatic dish wash, preferably a liquid manual dish wash detergent composition. Such compositions are known to a person of skill in the art.

In another embodiment, the cleaning composition is a hard surface cleaning composition that may be used for cleaning various surfaces such as hard wood, tile, ceramic, plastic, leather, metal, glass.

In another embodiment, the cleaning composition is designed to be used in cosmetic products, personal care and pet care compositions such as shampoo compositions, body wash formulations, liquid or solid soaps.

In one embodiment, the inventive graft polymers may be utilized in cleaning compositions comprising a surfactant system comprising $C_{10}$-$C_{15}$ alkyl benzene sulfonates (LAS) as the primary surfactant and one or more additional surfactants selected from non-ionic, cationic, amphoteric, zwitterionic or other anionic surfactants, or mixtures thereof.

In a further embodiment, the inventive graft polymers may be utilized in cleaning compositions, such as laundry detergents of any kind, and the like, comprising $C_8$-$C_{18}$ linear or branched alkyl ethersulfates with 1-5 ethoxy-units as the primary surfactant and one or more additional surfactants selected from non-ionic, cationic, amphoteric, zwitterionic or other anionic surfactants, or mixtures thereof.

In a further embodiment the inventive graft polymers may be utilized in cleaning compositions, such as laundry detergents of any kind, and the like, comprising $C_{12}$-$C_{18}$ alkyl ethoxylate surfactants with 5-10 ethoxy-units as the primary surfactant and one or more additional surfactants selected from anionic, cationic, amphoteric, zwitterionic or other non-ionic surfactants, or mixtures thereof.

In one embodiment, the graft polymer is a component of a cleaning composition, such as preferably a laundry or a dish wash formulation, more preferably a liquid laundry or manual dish wash formulation, that each additionally comprise at least one surfactant, preferably at least one anionic surfactant.

The selection of the additional surfactants in these embodiments may be dependent upon the application and the desired benefit.

Description of Cleaning Compositions, Formulations and their Ingredients

The phrase "cleaning composition" as used herein includes compositions and formulations designed for cleaning soiled material. Such compositions and formulations include those designed for cleaning soiled material or surfaces of any kind.

Compositions for "industrial and institutional cleaning" includes such cleaning compositions being designed for use in industrial and institutional cleaning, such as those for use of cleaning soiled material or surfaces of any kind, such as hard surface cleaners for surfaces of any kind, including tiles, carpets, PVC-surfaces, wooden surfaces, metal surfaces, lacquered surfaces.

"Compositions for Fabric and Home Care" include cleaning compositions including but not limited to laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, light duty liquid detergents compositions, heavy duty liquid detergent compositions, detergent gels commonly used for laundry, bleaching compositions, laundry additives, fabric enhancer compositions, and other suitable forms that may be apparent to one skilled in the art in view of the teachings herein. Such compositions may be used as a pre-laundering treatment, a post-laundering treatment, or may be added during the rinse or wash cycle of the laundering operation, preferably during the wash cycle of the laundering or dish washing operation. More preferably, such Composition for Fabric and Home Care is a laundry cleaning composition, a laundry care product or laundry washing product, most preferably a liquid laundry detergent formulation or liquid laundry detergent product.

The cleaning compositions of the invention may be in any form, namely, in the form of a "liquid" composition including liquid-containing composition types such as paste, gel, emulsion, foam and mousse; a solid composition such as powder, granules, micro-capsules, beads, noodles, pearlized balls, agglomerates, tablets, granular compositions, sheets, pastilles, beads, fibrous articles, bars, flakes; or a mixture thereof; types delivered in single-, dual- or multi-compartment pouches or containers; single-phase or multi-phase unit dose; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a user or consumer; and other homogeneous, non-homogeneous or single-phase or multiphase cleaning product forms.

The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof.

Non-limiting examples of "liquids"/"liquid compositions" include light duty and heavy duty liquid detergent compositions, fabric enhancers, detergent gels commonly used for laundry, bleach and laundry additives. Gases, e.g., suspended bubbles, or solids, e.g. particles, may be included within the liquids.

The liquid cleaning compositions preferably have a viscosity of from 50 to 10000 mPa*s; liquid manual dish wash cleaning compositions (also liquid manual "dish wash compositions") have a viscosity of preferably from 100 to 10000 mPa*s, more preferably from 200 to 5000 mPa*s and most preferably from 500 to 3000 mPa*s at 20 1/s and 20° C.; liquid laundry cleaning compositions have a viscosity of preferably from 50 to 3000 mPa*s, more preferably from 100 to 1500 mPa*s and most preferably from 200 to 1000 mPa*s at 20 1/s and 20° C.

The liquid cleaning compositions may have any suitable pH-value. Preferably the pH of the composition is adjusted to between 4 and 14. More preferably the composition has a pH of from 6 to 13, even more preferably from 6 to 10, most preferably from 7 to 9. The pH of the composition can be adjusted using pH modifying ingredients known in the art and is measured as a 10% product concentration in demineralized water at 25° C. For example, NaOH may be used and the actual weight % of NaOH may be varied and trimmed up to the desired pH such as pH 8.0. In one embodiment, a pH>7 is adjusted by using amines, preferably alkanolamines, more preferably triethanolamine.

Cleaning compositions such as fabric and home care products and formulations for industrial and institutional cleaning, more specifically such as laundry and manual dish wash detergents, are known to a person skilled in the art. Any composition etc. known to a person skilled in the art, in connection with the respective use, can be employed within the context by including at least one inventive polymer, preferably at least one polymer in amounts suitable for expressing a certain property within such a composition, especially when such a composition is used in its area of use.

One aspect is also the use of the inventive polymers as additives for detergent formulations, particularly for liquid detergent formulations, preferably concentrated liquid detergent formulations, or single mono doses for laundry.

The cleaning compositions of the invention may—and preferably do—contain adjunct cleaning additives (also abbreviated herein as "adjuncts"), such adjuncts being preferably in addition to a surfactant system as defined before.

Suitable adjunct cleaning additives include builders, co-builders, a surfactant system, fatty acids and/or salts thereof, structurants, thickeners and rheology modifiers, clay/soil removal/anti-redeposition agents, polymeric soil release agents, dispersants such as polymeric dispersing agents, polymeric grease cleaning agents, solubilizing agents, amphiphilic copolymers (including those that are free of vinyl pyrrolidone), chelating agents, enzymes, enzyme stabilizing systems, encapsulated benefit agents such as encapsulated perfume, bleaching compounds, bleaching agents, bleach activators, bleach catalysts, catalytic materials, brighteners, malodor control agents, pigments, dyes, opacifiers, pearlescent agents, hueing agents, dye transfer inhibiting agents, fabric softeners, carriers, suds boosters, suds suppressors (antifoams), color speckles, silver care, anti-tarnish and/or anti-corrosion agents, alkalinity sources, pH adjusters, pH-buffer agents, hydrotropes, scrubbing particles, anti-bacterial and anti-microbial agents, preservatives, antioxidants, softeners, carriers, fillers, solvents, processing aids, pro-perfumes, and perfumes.

The adjunct(s) may be present in the composition at levels suitable for the intended use of the composition. Typical usage levels range from as low as 0.001% by weight of composition for adjuncts such as optical brighteners to 50% by weight of composition for builders.

Liquid cleaning compositions additionally may comprise besides a surfactant system and graft polymer—and preferably do comprise at least one of—rheology control/modifying agents, emollients, humectants, skin rejuvenating actives, and solvents.

Solid compositions additionally may comprise—and preferably do comprise at least one of—fillers, bleaches, bleach activators and catalytic materials.

Suitable examples of such cleaning adjuncts and levels of use are found in WO 99/05242, U.S. Pat. Nos. 5,576,282, 6,306,812 B1 and 6,326,348 B1.

Those of ordinary skill in the art will understand that a detersive surfactant encompasses any surfactant or mixture of surfactants that provide cleaning, stain removing, or laundering benefit to soiled material.

Hence, the cleaning compositions of the invention such as fabric and home care products, and formulations for industrial and institutional cleaning, more specifically such as laundry and manual dish wash detergents, preferably additionally comprise a surfactant system and, more preferably, also further adjuncts, as the one described above and below in more detail.

The surfactant system may be composed from one surfactant or from a combination of surfactants selected from anionic surfactants, non-ionic surfactants, cationic surfactants, zwitterionic surfactants, amphoteric surfactants, and mixtures thereof. Those of ordinary skill in the art will understand that a surfactant system for detergents encompasses any surfactant or mixture of surfactants that provide cleaning, stain removing, or laundering benefit to soiled material.

The cleaning compositions of the invention preferably comprise a surfactant system in an amount sufficient to provide desired cleaning properties. In some embodiments, the cleaning composition comprises, by weight of the composition, from about 1% to about 70% of a surfactant system. In other embodiments, the liquid cleaning composition comprises, by weight of the composition, from about 2% to about 60% of the surfactant system. In further embodiments, the cleaning composition comprises, by weight of the composition, from about 5% to about 30% of the surfactant system. The surfactant system may comprise a detersive surfactant selected from anionic surfactants, non-ionic surfactants, cationic surfactants, zwitterionic surfactants, amphoteric surfactants, and mixtures thereof Laundry Compositions In laundry formulations, anionic surfactants contribute usually by far the largest share of surfactants within such formulation. Hence, preferably, the inventive cleaning compositions for use in laundry comprise at least one anionic surfactant and optionally further surfactants selected from any of the surfactants classes described herein, preferably from non-ionic surfactants and/or amphoteric surfactants and/or zwitterionic surfactants and/or cationic surfactants.

Nonlimiting examples of anionic surfactants—which may be employed also in combinations of more than one surfactant—useful herein include C9-C20 linear alkylbenzene sulfonates (LAS), C10-C20 primary, branched chain and random alkyl sulfates (AS); C10-C18 secondary (2,3) alkyl sulfates; C10-C18 alkyl alkoxy sulfates (AExS) wherein x is from 1 to 30; C10-C18 alkyl alkoxy carboxylates comprising 1 to 5 ethoxy units; mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

Preferred examples of suitable anionic surfactants are alkali metal and ammonium salts of $C_8$-$C_{12}$-alkyl sulfates, of $C_{12}$-$C_{18}$-fatty alcohol ether sulfates, of $C_{12}$-$C_{18}$-fatty alcohol polyether sulfates, of sulfuric acid half-esters of ethoxylated $C_4$-$C_{12}$-alkylphenols (ethoxylation: 3 to 50 mol of ethylene oxide/mol), of $C_{12}$-$C_{18}$-alkylsulfonic acids, of $C_{12}$-$C_{18}$ sulfo fatty acid alkyl esters, for example of $C_{12}$-$C_{18}$ sulfo fatty acid methyl esters, of $C_{10}$-$C_{18}$-alkylarylsulfonic acids, preferably of n-$C_{10}$-$C_{18}$-alkylbenzene sulfonic acids, of $C_{10}$-$C_{18}$ alkyl alkoxy carboxylates and of soaps such as for example $C_8$-$C_{24}$-carboxylic acids. Preference is given to the alkali metal salts of the aforementioned compounds, particularly preferably the sodium salts.

In one embodiment, anionic surfactants are selected from n-$C_{10}$-$C_{18}$-alkylbenzene sulfonic acids and from fatty alcohol polyether sulfates, which, within the context, are in particular sulfuric acid half-esters of ethoxylated $C_{12}$-$C_{18}$-alkanols (ethoxylation: 1 to 50 mol of ethylene oxide/mol), preferably of n-$C_{12}$-$C_{18}$-alkanols.

In one embodiment, also alcohol polyether sulfates derived from branched (i.e. synthetic) Cui-$C_{18}$-alkanols (ethoxylation: 1 to 50 mol of ethylene oxide/mol) may be employed.

Preferably, the alkoxylation group of both types of alkoxylated alkyl sulfates, based on $C_{12}$-$C_{18}$-fatty alcohols or based on branched (i.e. synthetic) $C_{11}$-$C_{18}$-alcohols, is an ethoxylation group and an average ethoxylation degree of any of the alkoxylated alkyl sulfates is 1 to 5, preferably 1 to 3.

Preferably, the laundry detergent formulation comprises from at least 1 wt % to 50 wt %, preferably in the range from greater than or equal to about 2 wt % to equal to or less than about 30 wt %, more preferably in the range from greater than or equal to 3 wt % to less than or equal to 25 wt %, and most preferably in the range from greater than or equal to 5 wt % to less than or equal to 25 wt % of one or more anionic surfactants as described above, based on the particular overall composition, including other components and water and/or solvents.

In a preferred embodiment, anionic surfactants are selected from C10-C15 linear alkylbenzenes sulfonates, C10-C18 alkylether sulfates with 1-5 ethoxy units and C10-C18 alkylsulfates.

Non-limiting examples of non-ionic surfactants—which may be employed also in combinations of more than one other surfactant—include: C8-C18 alkyl ethoxylates, such as, NEODOL® non-ionic surfactants from Shell; ethylenoxide/propylenoxide block alkoxylates as PLURONIC® from BASF; C14-C22 mid-chain branched alkyl alkoxylates, BAEx, wherein x is from 1 to 30, as discussed in U.S. Pat. Nos. 6,153,577, 6,020,303 and 6,093,856; alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Preferred examples of non-ionic surfactants are in particular alkoxylated alcohols and alkoxylated fatty alcohols, di- and multiblock copolymers of ethylene oxide and propylene oxide and reaction products of sorbitan with ethylene oxide or propylene oxide, furthermore alkylphenol ethoxylates, alkyl glycosides, polyhydroxy fatty acid amides (glucamides). Examples of (additional) amphoteric surfactants are so-called amine oxides.

Preferred examples of alkoxylated alcohols and alkoxylated fatty alcohols are, for example, compounds of the general formula (A)

[formula (A)]

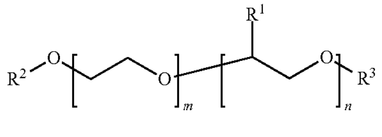

in which the variables are defined as follows:

R1 is selected from linear C1-C10-alkyl, preferably ethyl and particularly preferably methyl, R2 is selected from C8-C22-alkyl, for example n-C8H17, n-C10H21, n-C12H25, n-C14H29, n-C16H33 or n-C18H37, R3 is selected from C1-C10-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl, m and n are in the range from zero to 300, where the sum of n and m is at least one. Preferably, m is in the range from 1 to 100 and n is in the range from 0 to 30.

Here, compounds of the general formula (A) may be block copolymers or random copolymers, preference being given to block copolymers.

Other preferred examples of alkoxylated alcohols and alkoxylated fatty alcohols are, for example, compounds of the general formula (B)

[formula (B)]

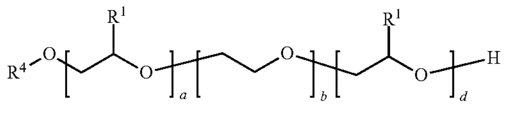

in which the variables are defined as follows:

$R^1$ is identical or different and selected from linear $C_1$-$C_4$-alkyl, preferably identical in each case and ethyl and particularly preferably methyl, $R^4$ is selected from $C_6$-$C_{20}$-alkyl, in particular n-$C_8H_{17}$, n-$C_{12}H_{25}$, n-$C_{14}H_{29}$, n-$C_{16}H_{33}$, n-$C_{18}H_{37}$, a is a number in the range from zero to 6, preferably 1 to 6, b is a number in the range from zero to 20, preferably 4 to 20, d is a number in the range from 4 to 25.

Preferably, at least one of a and b is greater than zero.

Here, compounds of the general formula (B) may be block copolymers or random copolymers, preference being given to block copolymers.

Further suitable non-ionic surfactants are selected from di- and multiblock copolymers, composed of ethylene oxide and propylene oxide. Further suitable non-ionic surfactants are selected from ethoxylated or propoxylated sorbitan esters. Alkylphenol ethoxylates or alkyl polyglycosides or polyhydroxy fatty acid amides (glucamides) are likewise suitable. An overview of suitable further non-ionic surfactants can be found in EP-A 0 851 023 and in DE-A 198 19 187.

Mixtures of two or more different non-ionic surfactants may of course also be present. In a preferred embodiment, non-ionic surfactants are selected from C12/14 and C16/18 fatty alkoholalkoxylates, C13/15 oxoalkoholalkoxylates, C13-alkoholalkoxylates, and 2-propylheptylalkoholalkoxylates, each of them with 3-15 ethoxy units, preferably 5-10 ethoxy units, or with 1-3 propoxy- and 2-15 ethoxy units.

Non-limiting examples of amphoteric surfactants—which may be employed also in combinations of more than one other surfactant—include: water-soluble amine oxides containing one alkyl moiety of from about 8 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704, and 4,133,779. Suitable surfactants include thus so-called amine oxides, such as lauryl dimethyl amine oxide ("lauramine oxide").

Preferred examples of amphoteric surfactants are amine oxides. Preferred amine oxides are alkyl dimethyl amine oxides or alkyl amido propyl dimethyl amine oxides, more preferably alkyl dimethyl amine oxides and especially coco dimethyl amino oxides. Amine oxides may have a linear or mid-branched alkyl moiety. Typical linear amine oxides include water-soluble amine oxides containing one R1=C8-18 alkyl moiety and two R2 and R3 moieties selected from the group consisting of C1-C3 alkyl groups and C1-C3 hydroxyalkyl groups. Preferably, the amine oxide is characterized by the formula

R1-N(R2)(R3)—O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, and linear C12-C14 alkyl dimethyl amine oxides. As used herein "mid-branched" means that the amine oxide has one alkyl moiety having n1 carbon atoms with one alkyl branch on the alkyl moiety having n2 carbon atoms. The alkyl branch is located on the alpha carbon from the nitrogen on the alkyl moiety. This type of branching for the amine oxide is also known in the art as an internal amine oxide. The total sum of n1 and n2 is from 10 to 24 carbon atoms, preferably from 12 to 20, and more preferably from 10 to 16. The number of carbon atoms for the one alkyl moiety (n1) should be approximately the same number of carbon atoms as the one alkyl branch (n2) such that the one alkyl moiety and the one alkyl branch are symmetric. As used herein "symmetric" means that (n1-n2) is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-C3 alkyl, a C1-C3 hydroxyalkyl group, or a polyethylene oxide group containing an average of from about 1 to about 3 ethylene oxide groups. Preferably the two moieties are selected from a C1-C3 alkyl, more preferably both are selected as a C1 alkyl.

In a preferred embodiment, amphoteric surfactants are selected from C8-C18 alkyl-dimethyl aminoxides and C8-C18 alkyl-di(hydroxyethyl)aminoxide.

Cleaning compositions may also contain zwitterionic surfactants—which may be employed also in combinations of more than one other surfactant.

Suitable zwitterionic surfactants include betaines, such as alkyl betaines, alkylamidobetaine, amidazoliniumbetaine, sulfobetaine (INCI Sultaines) as well as the phosphobetaines. Examples of suitable betaines and sulfobetaines are the following (designated in accordance with INCI): Almond amidopropyl of betaines, Apricotamidopropyl betaines, Avocadamidopropyl of betaines, Babassuamidopropyl of betaines, Behenamidopropyl betaines, Behenyl of betaines, Canol amidopropyl betaines, Capryl/Capramidopropyl betaines, Carnitine, Cetyl of betaines, Cocamidoethyl of betaines, Cocamidopropyl betaines, Cocamidopropyl Hydroxysultaine, Coco betaines, Coco Hydroxysultaine, Coco/Oleam idopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucamidopropyl Hydroxysultaine, Hydrogenated Tallow of betaines, Isostearamid-opropyl betaines, Lauramidopropyl betaines, Lauryl of betaines, Lauryl Hydroxysultaine, Lauryl Sultaine, Milkamidopropyl betaines, Minkamidopropyl of betaines, Myristamidopropyl betaines, Myristyl of betaines, Oleamidopropyl betaines, Oleamidopropyl Hydroxysultaine, Oleyl of betaines, Olivamidopropyl of betaines, Palmamidopropyl betaines, Palmitamidopropyl betaines, Palmitoyl Carnitine, Palm Kernelamidopropyl betaines, Polytetrafluoroethylene Acetoxypropyl of betaines, Ricinoleam idopropyl betaines, Sesamidopropyl betaines, Soyamidopropyl betaines, Stearamidopropyl betaines, Stearyl of betaines, Tallowamidopropyl betaines, Tallowamidopropyl Hydroxysultaine, Tallow of betaines, Tallow Dihydroxyethyl of betaines, Undecylenamidopropyl betaines and Wheat Germamidopropyl betaines.

Preferred betaines are, for example, $C_{12}$-$C_{18}$-alkyl-betaines and sulfobetaines. The zwitterionic surfactant preferably is a betaine surfactant, more preferable a Cocoamidopropylbetaine surfactant.

Non-limiting examples of cationic surfactants—which may be employed also in combinations of more than one other surfactant—include: the quaternary ammonium surfactants, which can have up to 26 carbon atoms include: alkoxylated quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Compositions according to the invention may comprise at least one builder. In the context, no distinction will be made between builders and such components elsewhere called "co-builders". Examples of builders are complexing agents, hereinafter also referred to as complexing agents, ion exchange compounds, dispersing agents, scale inhibiting agents and precipitating agents. Builders are selected from citrate, phosphates, silicates, carbonates, phosphonates, amino carboxylates and polycarboxylates.

In the context, the term citrate includes the mono- and the dialkali metal salts and in particular the mono- and preferably the trisodium salt of citric acid, ammonium or substituted ammonium salts of citric acid as well as citric acid. Citrate can be used as the anhydrous compound or as the hydrate, for example as sodium citrate dihydrate. Quantities of citrate are calculated referring to anhydrous tri sodium citrate.

The term phosphate includes sodium metaphosphate, sodium orthophosphate, sodium hydrogenphosphate, sodium pyrophosphate and polyphosphates such as sodium tripolyphosphate. Preferably, however, the composition according to the invention is free from phosphates and polyphosphates, with hydrogenphosphates being subsumed, for example free from trisodium phosphate, pentasodium tripolyphosphate and hexasodium metaphosphate ("phosphate-free"). In connection with phosphates and polyphosphates, "free from" should be understood within the context as meaning that the content of phosphate and polyphosphate is in total in the range from 10 ppm to 0.2% by weight of the respective composition, determined by gravimetry.

The term carbonates includes alkali metal carbonates and alkali metal hydrogen carbonates, preferred are the sodium salts. Particularly preferred is $Na_2CO_3$.

Examples of phosphonates are hydroxyalkanephosphonates and aminoalkanephosphonates. Among the hydroxyalkanephosphonates, the 1-hydroxyethane-1,1-diphosphonate (HEDP) is of particular importance as builder. It is preferably used as sodium salt, the disodium salt being neutral and the tetrasodium salt being alkaline (pH 9). Suitable aminoalkanephosphonates are preferably ethylene diaminetetramethylenephosphonate (EDTMP), diethylenetriaminepentamethylenephosphonate (DTPMP), and also their higher homologues. They are preferably used in the form of the neutrally reacting sodium salts, e.g. as hexasodium salt of EDTMP or as hepta- and octa-sodium salts of DTPMP.

Examples of amino carboxylates and polycarboxylates are nitrilotriacetates, ethylene diamine tetraacetate, diethylene triamine pentaacetate, triethylene tetraamine hexaacetate, propylene diamines tetraacetic acid, ethanol-diglycines, methylglycine diacetate, and glutamine diacetate. The term amino carboxylates and polycarboxylates also include their respective non-substituted or substituted ammonium salts and the alkali metal salts such as the sodium salts, in particular of the respective fully neutralized compound.

Silicates in the context include in particular sodium disilicate and sodium metasilicate, alumosilicates such as for example zeolites and sheet silicates, in particular those of the formula $\alpha$-$Na_2Si_2O_5$, $\beta$-$Na_2Si_2O_5$, and $\delta$-$Na_2Si_2O_5$.

Compositions according to the invention may contain one or more builder selected from materials not being mentioned above. Examples of builders are $\alpha$-hydroxypropionic acid and oxidized starch.

In one embodiment, builder is selected from polycarboxylates. The term "polycarboxylates" includes non-polymeric polycarboxylates such as succinic acid, $C_2$-$C_{16}$-alkyl disuccinates, $C_2$-$C_{16}$-alkenyl disuccinates, ethylene diamine N,N'-disuccinic acid, tartaric acid diacetate, alkali metal malonates, tartaric acid monoacetate, propanetricarboxylic acid, butanetetracarboxylic acid and cyclopentanetetracarboxylic acid.

Oligomeric or polymeric polycarboxylates are for example polyaspartic acid and its alkali metal salts, in particular its sodium salt, (meth)acrylic acid homopolymers and (meth)acrylic acid copolymers and their alkali metal salts, in particular their sodium salts.

Suitable co-monomers are monoethylenically unsaturated dicarboxylic acids such as maleic acid, fumaric acid, maleic anhydride, itaconic acid and citraconic acid. A suitable polymer is in particular polyacrylic acid, which preferably has a weight-average molecular weight $M_w$ in the range from 2000 to 40 000 g/mol, preferably 2000 to 10 000 g/mol, in particular 3000 to 8000 g/mol. Further suitable copolymeric polycarboxylates are in particular those of acrylic acid with methacrylic acid and of acrylic acid or methacrylic acid with maleic acid and/or fumaric acid or anhydrides thereof such as maleic anhydride. Suitable copolymers are in particular copolymers of acrylic acid and maleic acid of a weight average molecular weight Mw in the range of 2000 to 100000, preferably 3000 to 80000.

The preferred weight-average molecular weight Mw of the polyaspartic acid lies in the range between 1000 g/mol and 20 000 g/mol, preferably between 1500 and 15 000 g/mol and particularly preferably between 2000 and 10 000 g/mol.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilically or hydrophobically modified co-monomer as listed below.

Suitable hydrophobic co-monomers are, for example, isobutene, diisobutene, butene, pentene, hexene and styrene, olefins with ten or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-$\alpha$-olefin, a mixture of $C_{20}$-$C_{24}$-$\alpha$-olefins and polyisobutene having on average 12 to 100 carbon atoms per molecule.

Suitable hydrophilic co-monomers are monomers with sulfonate or phosphonate groups, and also non-ionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)

acrylate. Polyalkylene glycols here can comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinyl sulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Further suitable oligomeric or polymeric polycarboxylates comprise graft polymers of (meth)acrylic acid or maleic acid onto polysaccharides such as degraded starch, carboxymethylated polysaccharides such as carboxymethylated cellulose, carboxymethylated inulin or carboxymethylated starch or polyepoxysuccinic acid and their alkali metal salts, in particular their sodium salts.

Moreover, amphoteric polymers can also be used as builders.

Compositions according to the invention can comprise, for example, in the range from in total 0.1 to 90% by weight, preferably 5 to 80% by weight, preferably up to 70% by weight, of builder(s), especially in the case of solid formulations. Liquid formulations according to the invention preferably comprise in the range of from 0.1 to 20% by weight of builder, such as up to 85, 75, 65, 60, 55, 50, 45, 40, 35, 30, 35, 15, or 10% by weight.

Formulations according to the invention can comprise one or more alkali carriers. Alkali carriers ensure, for example, a pH of at least 9 if an alkaline pH is desired. Of suitability are, for example, the alkali metal carbonates, the alkali metal hydrogen carbonates, and alkali metal metasilicates mentioned above, and, additionally, alkali metal hydroxides. A preferred alkali metal is in each case potassium, particular preference being given to sodium. In one embodiment, a pH>7 is adjusted by using amines, preferably alkanolamines, more preferably triethanolamine.

In one embodiment, the laundry formulation according to the invention comprises additionally at least one enzyme.

Useful enzymes are, for example, one or more hydrolases selected from 1 preferably selected from one or more lipases, hydrolases, amylases, proteases, cellulases, hemicellulases, phospholipases, esterases, pectinases, pectate lyases, mannanases, lactases and peroxidases, and combinations of at least two of the foregoing types.

Such enzyme(s) can be incorporated at levels sufficient to provide an effective amount for cleaning. The preferred amount is in the range from 0.001% to 5% of active enzyme by weight in the detergent composition according to the invention. Together with enzymes also enzyme stabilizing systems may be used such as for example calcium ions, boric acid, boronic acid, propylene glycol and short chain carboxylic acids. In the context, short chain carboxylic acids are selected from monocarboxylic acids with 1 to 3 carbon atoms per molecule and from dicarboxylic acids with 2 to 6 carbon atoms per molecule. Preferred examples are formic acid, acetic acid, propionic acid, oxalic acid, succinic acid, $HOOC(CH_2)_3COOH$, adipic acid and mixtures from at least two of the foregoing, as well as the respective sodium and potassium salts.

Compositions according to the invention may comprise one or more bleaching agent (bleaches).

Preferred bleaches are selected from sodium perborate, anhydrous or, for example, as the monohydrate or as the tetrahydrate or so-called dihydrate, sodium percarbonate, anhydrous or, for example, as the monohydrate, and sodium persulfate, where the term "persulfate" in each case includes the salt of the peracid $H_2SO_5$ and also the peroxodisulfate.

In this connection, the alkali metal salts can in each case also be alkali metal hydrogen carbonate, alkali metal hydrogen perborate and alkali metal hydrogen persulfate. However, the dialkali metal salts are preferred in each case.

Formulations according to the invention can comprise one or more bleach catalysts. Bleach catalysts can be selected from oxaziridinium-based bleach catalysts, bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Formulations according to the invention can comprise one or more bleach activators, for example tetraacetyl ethylene diamine, tetraacetylmethylene diamine, tetraacetylglycoluril, tetraacetylhexylene diamine, acylated phenolsulfonates such as for example n-nonanoyl- or isononanoyloxybenzene sulfonates, N-methylmorpholinium-acetonitrile salts ("MMA salts"), trimethylammonium acetonitrile salts, N-acylimides such as, for example, N-nonanoyl succinimide, 1,5-diacetyl-2,2-dioxohexahydro-1,3,5-triazine ("DADHT") or nitrile quats (trimethylammonium acetonitrile salts).

Formulations according to the invention can comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment, formulations according to the invention comprise in total in the range from 0.1 to 1.5% by weight of corrosion inhibitor.

Formulations according to the invention may also comprise further cleaning polymers and/or soil release polymers and/or anti-graying polymers.

The further cleaning polymers may include, without limitation, "multifunctional polyethylene imines" (for example BASF's Sokalan® HP20) and/or "multifunctional diamines" (for example BASF's Sokalan® HP96). Such multifunctional polyethylene imines are typically ethoxylated polyethylene imines with a weight-average molecular weight $M_w$ in the range from 3000 to 250000, preferably 5000 to 200000, more preferably 8000 to 100000, more preferably 8000 to 50000, more preferably 10000 to 30000, and most preferably 10000 to 20000 g/mol. Suitable multifunctional polyethylene imines have 80 wt % to 99 wt %, preferably 85 wt % to 99 wt %, more preferably 90 wt % to 98 wt %, most preferably 93 wt % to 97 wt % or 94 wt % to 96 wt % ethylene oxide side chains, based on the total weight of the materials. Ethoxylated polyethylene imines are typically based on a polyethylene imine core and a polyethylene oxide shell. Suitable polyethylene imine core molecules are polyethylene imines with a weight-average molecular weight $M_w$ in the range of 500 to 5000 g/mol. Preferably employed is a molecular weight from 500 to 1000 g/mol, even more preferred is a $M_w$ of 600 to 800 g/mol. The ethoxylated polymer then has on average 5 to 50, preferably 10 to 35 and even more preferably 20 to 35 ethylene oxide (EO) units per NH-functional group.

Suitable multifunctional diamines are typically ethoxylated $C_2$ to $C_{12}$ alkylene diamines, preferably hexamethylene diamine, which are further quaternized and optionally sulfated. Typical multifunctional diamines have a weight-average molecular weight $M_w$ in the range from 2000 to 10000, more preferably 3000 to 8000, and most preferably 4000 to 6000 g/mol. In a preferred embodiment of the invention, ethoxylated hexamethylene diamine, furthermore quaternized and sulfated, may be employed, which contains on average 10 to 50, preferably 15 to 40 and even more preferably 20 to 30 ethylene oxide (EO) groups per NH-functional group, and which preferably bears two cationic ammonium groups and two anionic sulfate groups.

In a preferred embodiment, the cleaning compositions may contain at least one multifunctional polyethylene imine and/or at least one multifunctional diamine to improve the cleaning performance, such as preferably improve the stain removal ability, especially the primary detergency of particulate stains on polyester fabrics of laundry detergents. The multifunctional polyethylene imines or multifunctional diamines or mixtures thereof according to the descriptions above may be added to the laundry detergents and cleaning compositions in amounts of generally from 0.05 to 15 wt %, preferably from 0.1 to 10 wt % and more preferably from 0.25 to 5 wt % and even as low as up to 2 wt. %, based on the particular overall composition, including other components and water and/or solvents.

Thus, one aspect is a laundry detergent composition, in particular a liquid laundry detergent, comprising (i) at least one inventive polymer and (ii) at least one compound selected from multifunctional polyethylene imines and multifunctional diamines and mixtures thereof.

In one embodiment, the ratio of the at least one inventive polymer and (ii) the at least one compound selected from multifunctional polyethylene imines and multifunctional diamines and mixtures thereof, is from 10:1 to 1:10, preferably from 5:1 to 1:5 and more preferably from 3:1 to 1:3.

Suitable anti-graying polymers comprise copolymers of acrylic or maleic acid and styrene, graft polymers of acrylic acid onto maltodextrin or carboxymethylated cellulose and their alkali metal salts, in particular their sodium salts.

Laundry formulations comprising the inventive polymer may also comprise at least one complexing agent.

Preferred complexing agents are methylglycinediacetic acid (MGDA) and glutamic acid diacetic acid (GLDA) and salts thereof. Particularly preferred complexing agents are methylglycinediacetic acid and salts thereof. According to the invention, preference is given to 1 to 50%, or even 1 to 20%, by weight of complexing agents.

MGDA and GLDA can be present as racemate or as enantiomerically pure compound. GLDA is preferably selected from L-GLDA or enantiomerically enriched mixtures of L-GLDA in which at least 80 mol %, preferably at least 90 mol %, of L-GLDA is present.

In one embodiment, complexing agent is racemic MGDA. In another embodiment, complexing agent is selected from L-MGDA and from enantiomer mixtures of L- and D-MGDA in which L-MGDA predominates and in which the L/D molar ratio is in the range from 55:45 to 95:5, preferably 60:40 to 85:15. The L/D molar ratio can be determined for example by polarimetry or by chromatographic means, preferably by HPLC with a chiral column, for example with cyclodextrin as stationary phase or with an optically active ammonium salt immobilized on the column. For example, it is possible to use an immobilized D-penicillamine salt.

MGDA or GLDA is preferably used as the salt. Preferred salts are ammonium salts and alkali metal salts, particularly preferably the potassium and in particular the sodium salts. These can for example have the general formula (CA I) or (CA II):

$$[CH_3—CH(COO)—N(CH_2—COO)_2]Na_{3\text{-}x\text{-}y}K_xH_y \quad \text{(CA I)}$$

x in the range from 0.0 to 0.5, preferably up to 0.25, y in the range from 0.0 to 0.5, preferably up to 0.25, $$[OOC—(CH_2)_2—CH(COO)—N(CH_2—COO)_2]Na_{4\text{-}x\text{-}y}K_xH_y \quad \text{(CA II)}$$

x in the range from 0.0 to 0.5, preferably up to 0.25, y in the range from 0.0 to 0.5, preferably up to 0.25.

Very particular preference is given to the trisodium salt of MGDA and the tetrasodium salt of GLDA.

Laundry formulations comprising the inventive polymer may also comprise at least one antimicrobial agent.

The antimicrobial agent may be selected from the list consisting of 2-phenoxyethanol (CAS-no. 122-99-6, for example Protectol® PE available from BASF) and 4,4'-dichloro-2-hydroxydiphenylether (CAS: 3380-30-1), and combinations thereof.

The 4,4'-dichloro-2-hydroxydiphenylether may be used as a solution, for example a solution of 30 wt % of 4,4'-dichloro-2-hydroxydiphenylether in 1,2-propyleneglycol, e.g. Tinosan® HP 100 available from BASF.

The inventive laundry formulation may comprise at least one antimicrobial agent from the above list and/or a combination thereof, and/or a combination with at least one further antimicrobial agent not listed here.

The antimicrobial agent may be added to the inventive laundry formulation in a concentration of 0.0001 wt % to 10 wt % relative to the total weight of the composition.

Preferably, the formulation contains 2-phenoxyethanol in a concentration of 0.01 wt % to 5 wt %, more preferably 0.1 wt % to 2 wt % and/or 4,4'-dichloro 2-hydroxydiphenyl ether in a concentration of 0.001 wt % to 1 wt %, more preferably 0.002 wt % to 0.6 wt % (in all cases relative to the total weight of the composition).

Formulations according to the invention may also comprise water and/or additional organic solvents, e.g. ethanol or propylene glycol, and/or fillers such as sodium sulfate.

Further optional ingredients may be but are not limited to viscosity modifiers, cationic surfactants, foam boosting or foam reducing agents, perfumes, dyes, optical brighteners, and dye transfer inhibiting agents.

Dish Wash Compositions

Another aspect is also a dish wash composition, comprising at least one inventive polymer as described above.

Thus, an aspect is also the use of the inventive polymer as described above, in dish wash applications, such as manual or automated dish wash applications.

Dish wash compositions according to the invention can be in the form of a liquid, semi-liquid, cream, lotion, gel, or solid composition, solid embodiments encompassing, for example, powders and tablets. Liquid compositions are typically preferred for manual dish wash applications, whereas solid formulations and pouch formulations (where the pouches may also contain solids in addition to liquid ingredients) are typically preferred for automated dish washing compositions; however, in some areas of the world also liquid automated dish wash compositions are used and are thus of course also encompassed by the term "dish wash composition".

The dish wash compositions are intended for direct or indirect application onto dishware and metal and glass surfaces, such as drinking and other glasses, beakers, dish and cooking ware like pots and pans, and cutlery such as forks, spoons, knives and the like.

The inventive method of cleaning dishware, metal and/or glass surfaces comprises the step of applying the dish wash cleaning composition, preferably in liquid form, onto the surface, either directly or by means of a cleaning implement, i.e., in neat form. The composition is applied directly onto the surface to be treated and/or onto a cleaning device or implement such as a dish cloth, a sponge or a dish brush and the like without undergoing major dilution (immediately) prior to the application. The cleaning device or implement is preferably wet before or after the composition is delivered to it. In the method of the invention, the composition can also be applied in diluted form.

Both neat and dilute application give rise to superior cleaning performance, i.e. the formulations of the invention containing at least one inventive polymer exhibit excellent degreasing properties. The effort of removing fat and/or oily soils from the dishware, metal and/or glass surfaces is decreased due to the presence of the inventive polymer, even when the level of surfactant used is lower than in conventional compositions.

Preferably the composition is formulated to provide superior grease cleaning (degreasing) properties, long-lasting suds and/or improved viscosity control at decreased temperature exposures; preferably at least two, more preferably all three properties are present in the inventive dish wash composition. Optional—preferably present—further benefits of the inventive manual dish wash composition include soil removal, shine, and/or hand care; more preferably at least two and most preferably all three further benefits are present in the inventive dish wash composition.

In one embodiment, the inventive polymer is one component of a manual dish wash formulation that additionally comprises at least one surfactant, preferably at least one anionic surfactant.

In another embodiment, the inventive polymer is one component of a manual dish wash formulation that additionally comprises at least one anionic surfactant and at least one other surfactant, preferably selected from amphoteric surfactants and/or zwitterionic surfactants. In a preferred embodiment, the manual dish wash formulations contain at least one amphoteric surfactant, preferably an amine oxide, or at least one zwitterionic surfactant, preferably a betaine, or mixtures thereof, to aid in the foaming, detergency, and/or mildness of the detergent composition.

Examples of suitable anionic surfactants are already mentioned above for laundry compositions.

Preferred anionic surfactants for dish wash compositions are selected from $C_{10}$-$C_{15}$ linear alkylbenzenesulfonates, $C_{10}$-$C_{18}$ alkylethersulfates with 1-5 ethoxy units and $C_{10}$-$C_{18}$ alkyl sulfates.

Preferably, the manual dish wash detergent formulation comprises from at least 1 wt % to 50 wt %, preferably in the range from greater than or equal to about 3 wt % to equal to or less than about 35 wt %, more preferably in the range from greater than or equal to 5 wt % to less than or equal to 30 wt %, and most preferably in the range from greater than or equal to 5 wt % to less than or equal to 20 wt % of one or more anionic surfactants as described above, based on the particular overall composition, including other components and water and/or solvents.

Dish wash compositions according to the invention may comprise at least one amphoteric surfactant.

Examples of suitable amphoteric surfactants for dish wash compositions are already mentioned above for laundry compositions.

Preferred amphoteric surfactants for dish wash compositions are selected from $C_8$-$C_{18}$ alkyl-dimethyl aminoxides and $C_8$-$C_{18}$ alkyl-di(hydroxyethyl)aminoxide.

The manual dish wash detergent composition of the invention preferably comprises from 1 wt % to 15 wt %, preferably from 2 wt % to 12 wt %, more preferably from 3 wt % to 10 wt % of the composition of an amphoteric surfactant, preferably an amine oxide surfactant. Preferably the composition of the invention comprises a mixture of the anionic surfactants and alkyl dimethyl amine oxides in a weight ratio of less than about 10:1, more preferably less than about 8:1, more preferably from about 5:1 to about 2:1.

Addition of the amphoteric surfactant provides good foaming properties in the dish wash composition.

Dish wash compositions according to the invention may comprise at least one zwitterionic surfactant.

Examples of suitable zwitterionic surfactants for dish wash compositions are already mentioned above for laundry compositions.

Preferred zwitterionic surfactants for dish wash compositions are selected from betaine surfactants, more preferable from Cocoamidopropylbetaine surfactants.

In a preferred embodiment, the zwitterionic surfactant is Cocamidopropylbetaine.

The manual dish wash detergent composition of the invention optionally comprises from 1 wt % to 15 wt %, preferably from 2 wt % to 12 wt %, more preferably from 3 wt % to 10 wt % of the composition of a zwitterionic surfactant, preferably a betaine surfactant.

Dish wash compositions according to the invention may comprise at least one cationic surfactant.

Examples of suitable cationic surfactants for dish wash compositions are already mentioned above for laundry compositions.

Cationic surfactants, when present in the composition, are present in an effective amount, more preferably from 0.1 wt % to 5 wt %, preferably 0.2 wt % to 2 wt % of the composition.

Dish wash compositions according to the invention may comprise at least one non-ionic surfactant.

Examples of suitable non-ionic surfactants for dish wash compositions are already mentioned above for laundry compositions.

Preferred non-ionic surfactants are the condensation products of Guerbet alcohols with from 2 to 18 moles, preferably 2 to 15, more preferably 5-12 of ethylene oxide per mole of alcohol. Other preferred non-ionic surfactants for use herein include fatty alcohol polyglycol ethers, alkylpolyglucosides and fatty acid glucamides.

The manual hand dish detergent composition may comprise from 0.1 wt % to 10 wt %, preferably from 0.3 wt % to 5 wt %, more preferably from 0.4 wt % to 2 wt % of the composition, of a linear or branched C10 alkoxylated non-ionic surfactant having an average degree of alkoxylation of from 2 to 6, preferably from 3 to 5. Preferably, the linear or branched C10 alkoxylated non-ionic surfactant is a branched C10 ethoxylated non-ionic surfactant having an average degree of ethoxylation of from 2 to 6, preferably of from 3 to 5. Preferably, the composition comprises from 60 wt % to 100 wt %, preferably from 80 wt % to 100 wt %, more preferably 100 wt % of the total linear or branched C10 alkoxylated non-ionic surfactant of the branched C10 ethoxylated non-ionic surfactant. The linear or branched C10 alkoxylated non-ionic surfactant preferably is a 2-propylheptyl ethoxylated non-ionic surfactant having an average degree of ethoxylation of from 3 to 5. A suitable 2-propylheptyl ethoxylated non-ionic surfactant having an average degree of ethoxylation of 4 is Lutensol® XP40, commercially available from BASF SE, Ludwigshafen, Germany. The use of a 2-propylheptyl ethoxylated non-ionic surfactant having an average degree of ethoxylation of from 3 to 5 leads to improved foam levels and long-lasting suds.

Thus, one aspect is a manual dish wash detergent composition, in particular a liquid manual dish wash detergent composition, comprising (i) at least one inventive polymer, and (ii) at least one further 2-propylheptyl ethoxylated non-ionic surfactant having an average degree of ethoxylation of from 3 to 5.

Dish wash compositions according to the invention may comprise at least one hydrotrope in an effective amount, to ensure the compatibility of the liquid manual dish wash detergent compositions with water.

Suitable hydrotropes for use herein include anionic hydrotropes, particularly sodium, potassium, and ammonium xylene sulfonate, sodium, potassium and ammonium toluene sulfonate, sodium, potassium, and ammonium cumene sulfonate, and mixtures thereof, and related compounds, as disclosed in U.S. Pat. No. 3,915,903.

The liquid manual dish wash detergent compositions typically comprise from 0.1 wt % to 15 wt % of the total liquid detergent composition of a hydrotrope, or mixtures thereof, preferably from 1 wt % to 10 wt %, most preferably from 2 wt % to 5 wt % of the total liquid manual dish wash composition.

Dish wash compositions according to the invention may comprise at least one organic solvent.

Examples of organic solvents are C4-C14 ethers and diethers, glycols, alkoxylated glycols, C6-C16 glycol ethers, alkoxylated aromatic alcohols, aromatic alcohols, aliphatic branched alcohols, alkoxylated aliphatic branched alcohols, alkoxylated linear C1-C5 alcohols, linear C1-C5 alcohols, amines, C8-C14 alkyl and cycloalkyl hydrocarbons and halohydrocarbons, and mixtures thereof.

When present, the liquid dish wash compositions will contain from 0.01 wt % to 20 wt %, preferably from 0.5 wt % to 15 wt %, more preferably from 1 wt % to 10 wt %, most preferably from 1 wt % to 5 wt % of the liquid detergent composition of a solvent. These solvents may be used in conjunction with an aqueous liquid carrier, such as water, or they may be used without any aqueous liquid carrier being present. At higher solvent systems, the absolute values of the viscosity may drop but there is a local maximum point in the viscosity profile.

The dish wash compositions herein may further comprise from 30 wt % to 90 wt % of an aqueous liquid carrier, comprising water, in which the other essential and optional ingredients are dissolved, dispersed or suspended. More preferably the compositions comprise from 45 wt % to 85 wt %, even more preferably from 60 wt % to 80 wt % of the aqueous liquid carrier. The aqueous liquid carrier, however, may contain other materials which are liquid, or which dissolve in the liquid carrier, at room temperature (25° C.) and which may also serve some other function besides that of an inert filler.

Dish wash compositions according to the invention may comprise at least one electrolyte. Suitable electrolytes are preferably selected from inorganic salts, even more preferably selected from monovalent salts, most preferably sodium chloride.

The liquid manual dish wash compositions according to the invention may comprise from 0.1 wt % to 5 wt %, preferably from 0.2 wt % to 2 wt % of the composition of an electrolyte.

Manual dish wash formulations comprising the inventive polymer may also comprise at least one antimicrobial agent.

Examples of suitable antimicrobial agents for dish wash compositions are already mentioned above for laundry compositions.

The antimicrobial agent may be added to the inventive hand dish wash composition in a concentration of 0.0001 wt % to 10 wt % relative to the total weight of composition. Preferably, the formulation contains 2-phenoxyethanol in a concentration of 0.01 wt % to 5 wt %, more preferably 0.1 wt % to 2 wt % and/or 4,4'-dichloro 2-hydroxydiphenyl ether in a concentration of 0.001 wt % to 1 wt %, more preferably 0.002 wt % to 0.6 wt % (in all cases relative to the total weight of the composition).

Further additional ingredients are such as but not limited to conditioning polymers, cleaning polymers, surface modifying polymers, soil flocculating polymers, rheology modifying polymers, enzymes, structurants, builders, chelating agents, cyclic diamines, emollients, humectants, skin rejuvenating actives, carboxylic acids, scrubbing particles, bleach and bleach activators, perfumes, malodor control agents, pigments, dyes, opacifiers, beads, pearlescent particles, microcapsules, antibacterial agents, pH adjusters including NaOH and alkanolamines such as monoethanolamines and buffering means.

General Cleaning Compositions and Formulations

In a preferred embodiment the graft polymer according to the present invention is used in a laundry detergent.

Liquid laundry detergents according to the present invention are composed of:

- 0.05-20% of at least one inventive polymer
- 1-50% of surfactants
- 0.1-40% of builders, cobuilders and/or chelating agents
- 0.1-50% other adjuncts
- water to add up 100%.

Preferred liquid laundry detergents according to the present invention are composed of:

- 0.5-15% of at least one inventive polymer
- 5-40% of anionic surfactants selected from C10-C15-LAS and C10-C18 alkyl ethersulfates containing 1-5 ethoxy-units
- 1.5-10% of nonionic surfactants selected from C10-C18-alkyl ethoxylates containing 3-10 ethoxy-units
- 2-20% of soluble organic builders/cobuilders selected from C10-C18 fatty acids, di- and tricarboxylic acids, hydroxy-di- and hydroxytricaboxylic acids, aminopolycarboxylates and polycarboxylic acids
- 0.05-5% of an enzyme system containing at least one enzyme suitable for detergent use and preferably also an enzyme stabilizing system
- 0.5-20% of mono- or diols selected from ethanol, isopropanol, ethylenglycol, or propylenglyclol
- 0.1-20% other adjuncts
- water to add up to 100%.

Solid laundry detergents (like e.g. powders, granules or tablets) can be composed of, for example:

- 0.2-20% of at least one inventive polymer
- 1-50% of surfactants
- 0.1-90% of builders, cobuilders and/or chelating agents
- 0-50% of fillers 0-40% of bleach actives 0.1-30% of other adjuncts and/or water wherein the sum of the ingredients adds up 100%.

Preferred solid laundry detergents according to the present invention are composed of:

0.5-10% of at least one inventive polymer 5-30% of anionic surfactants selected from C10-C15-LAS, C10-C18 alkyl sulfates and C10-C18 alkyl ethersulfates containing 1-5 ethoxy-units 1.5-7.5% of non-ionic surfactants selected from C10-C18-alkyl ethoxylates containing 3-10 ethoxy-units 20-80% of inorganic builders and fillers selected from sodium carbonate, sodium bicarbonate, zeolites, soluble silicates, sodium sulfate 0.5-15% of cobuilders selected from C10-C18 fatty acids, di- and tricarboxylic acids, hydroxydi- and hydroxytricarboxylic acids, aminopolycarboxylates and polycarboxylic acids 0.1-5% of an enzyme system containing at least one enzyme suitable for detergent use and preferably also an enzyme stabilizing system 0.5-30% of bleach actives 0.1-20% other adjuncts water to add up to 100%

In a preferred embodiment the polymer according to the present invention is used in a manual dish wash detergent.

Liquid manual dish wash detergents according to the present invention are composed of:

0.05-10% of at least one inventive polymer 1-50% of surfactants 0.1-50% of other adjuncts water to add up 100%.

Preferred liquid manual dish wash detergents according to the present invention are composed of:

0.2-5% of at least one inventive polymer 5-40% of anionic surfactants selected from C10-C15-LAS, C10-C18 alkyl ethersulfates containing 1-5 ethoxy-units, and C10-C18 alkyl sulfate 2-10% of Cocamidopropylbetaine 0-10% of Lauramine oxide 0-2% of a non-ionic surfactant, preferably a C10-Guerbet alcohol alkoxylate 0-5% of an enzyme, preferably Amylase, and preferably also an enzyme stabilizing system 0.5-20% of mono- or diols selected from ethanol, isopropanol, ethylenglycol, or propylenglyclol 0.1-20% other adjuncts water to add up to 100%

The following tables shows general cleaning compositions of certain types, which correspond to typical compositions correlating with typical washing conditions as typically employed in various regions and countries of the world. The at least one inventive polymer may be added to such formulation(s) in suitable amounts as outlined herein.

General Formula for Laundry Detergent Compositions According to the Invention: (Wt. %)

| Ingredient | Ranges of Ingredient in Liquid frame formulations |
|---|---|
| Linear alkyl benzene sulphonic acid | 0 to 30 |
| Coco fatty acid | 1 to 12 |
| Fatty alcohol ether sulphate | 0 to 25 |
| NaOH or mono or tri-ethanol amine | Add up to pH 7.5 to 9.0 |
| Alcohol ethoxylate | 3 to 10 |
| 1,2-Propylene glycol | 1 to 10 |
| Ethanol | 0 to 4 |
| Sodium citrate | 0 to 8 |
| water | Up to 100 |

Liquid Laundry Frame Formulations According to the Invention:

| Active (numbers: wt. % active) | F1 | F2 | F3 | F4 | F5 | F6 |
|---|---|---|---|---|---|---|
| alcohol ethoxylate 7EO | 5.40 | 10.80 | 12.40 | 7.30 | 1.60 | 7.60 |
| Coco fatty acid K12-18 | 2.40 | 3.10 | 3.20 | 3.20 | 3.50 | 6.40 |
| Fatty alcohol ether sulphate | 5.40 | 8.80 | 7.10 | 7.10 | 5.40 | 14.00 |
| Linear alkyl benzene sulphonic acid | 5.50 | 0.00 | 14.50 | 15.50 | 10.70 | 0.00 |
| 1,2 Propandiol | 6.00 | 3.50 | 8.70 | 8.70 | 1.10 | 7.80 |
| Triethanolamine | 0 | 0 | 0 | 0 | 0 | 0 |
| Monoethano-lamine | 0 | 0 | 4.00 | 4.30 | 0.30 | 0 |
| NaOH | 2.20 | 1.10 | 0 | 0 | 0 | 1.00 |
| Glycerol | 0 | 0.80 | 3.00 | 2.80 | 0 | 0 |
| Ethanol | 2.00 | 0 | 0 | 0 | 0.38 | 0.39 |
| Na citrate | 3.00 | 2.80 | 3.40 | 2.10 | 7.40 | 5.40 |
| Inventive Polymer(s) (total) | 0.2-15 | 0.2-15 | 0.2-15 | 0.2-15 | 0.2-15 | 0.2-15 |
| Other polymers | 0-10 | 0-10 | 0-10 | 0-10 | 0-10 | 0-10 |
| At least one enzyme (each) | 0-1 | 0-1 | 0-1 | 0-1 | 0-1 | 0-1 |
| water | to 100 | to 100 | to 100 | to 100 | to 100 | to 100 |

Liquid Laundry Frame Formulations According to the Invention—Continued:

| Active (numbers: wt. % active) | F7 | F8 | F9 | F10 | F11 | F12 | F13 | F14 |
|---|---|---|---|---|---|---|---|---|
| alcohol ethoxylate 7EO | 3.80 | 0.30 | 13.30 | 8.00 | 5.70 | 20.00 | 9.20 | 29.00 |
| Coco fatty acid K12-18 | 2.80 | 3.00 | 1.70 | 1.80 | 2.50 | 5.00 | 8.60 | 10.40 |
| Fatty alcohol ether sulphate | 2.80 | 4.50 | 3.90 | 4.10 | 0 | 10.00 | 22.20 | 0 |
| Linear alkyl benzene sulphonic acid | 6.30 | 5.43 | 11.45 | 5.90 | 10.10 | 10.00 | 28.00 | 27.00 |
| 1,2 Propandiol | 0.50 | 0 | 2.50 | 0.40 | 6.00 | 10.00 | 7.00 | 7.00 |
| Triethanolamine | 0 | 0 | 0 | 8.10 | 0 | 0 | 0 | 0 |
| Monoethanolamine | 0.40 | 1.80 | 0 | 0 | 0 | 0 | 8.00 | 7.00 |
| NaOH | 0 | 0 | 2.20 | 0 | 3.30 | 1.50 | 0 | 0 |
| Glycerol | 0 | 0.60 | 0.20 | 1.90 | 0 | 0 | 7.00 | 10.00 |
| Ethanol | 0 | 0 | 1.84 | 0 | 0 | 0 | 0 | 0 |
| Na citrate | 4.60 | 3.30 | 3.30 | 1.40 | 0 | 1.50 | 0 | 0 |

-continued

| Active (numbers: wt. % active) | F7 | F8 | F9 | F10 | F11 | F12 | F13 | F14 |
|---|---|---|---|---|---|---|---|---|
| Inventive Polymer(s) (total) | 0.2-15 | 0.2-15 | 0.2-15 | 0.2-15 | 0.2-15 | 0.2-15 | 0.2-15 | 0.2-15 |
| Other polymers | 0-10 | 0-10 | 0-10 | 0-10 | 0-10 | 0-10 | 0-10 | 0-10 |
| At least one enzyme (each) | 0-1.5 | 0-1.5 | 0-1.5 | 0-1.5 | 0-1.5 | 0-1.5 | 0-1.5 | 0-1.5 |
| water | to 100 | to 100 | to 100 | to 100 | to 100 | to 100 | to 100 | to 100 |

Laundry Powder Frame Formulations According to the Invention: (Wt. %)

| | Bleach free Powder | | | | | |
|---|---|---|---|---|---|---|
| Alcohol ethoxylate 7EO | 0.6 | 0 | 1 | 0 | 0 | 5.2 |
| Coco fatty acid K12-18 | 1.2 | 0 | 0 | 0 | 0 | 0 |
| Fatty alcohol ether sulphate | 1.5 | 0 | 0 | 0 | 0 | 6 |
| Linear alkyl benzene sulphonic acid | 12.1 | 11.2 | 13.6 | 21.9 | 18.7 | 12.7 |
| Bleach activator | 0 | 0 | 0 | 0 | 0 | 0 |
| Percarbonate | 0 | 0 | 0 | 0 | 0 | 0 |
| AcetateNa | 0 | 0 | 0 | 0.1 | 0 | 0.1 |
| CitrateNa | 0 | 0 | 0 | 0 | 0 | 14 |
| Na Silicate | 27.9 | 5.8 | 6.6 | 2 | 15 | 20.3 |
| Na Carbonate | 17.2 | 35 | 37.3 | 30.1 | 37 | 1 |
| Na Phosphate | 0 | 0 | 0 | 14 | 0.3 | 0 |
| Na Hydrogen-carbonate | 0.7 | 0.9 | 0.5 | 2.7 | 0.4 | 10.5 |
| Zeolite4A | 4.2 | 0.1 | 5.1 | 10.2 | 1.8 | 11.6 |
| HEDP | 0 | 0 | 0 | 0 | 0 | 0.13 |
| MGDA | 0 | 1.1 | 0 | 0 | 0 | 0 |
| At least one enzyme (each) | 0-1.5 | 0-1.5 | 0-1.5 | 0-1.5 | 0-1.5 | 0-1.5 |
| Na Sulfate | 30.8 | 1.3 | 33 | 11 | 22 | 3 |
| Na Chloride | 0.2 | 43 | 0.1 | 0 | 0.1 | 0.1 |
| optical brightener | 0.02 | 0 | | 0.1 | 0.06 | |
| Inventive Polymer(s) (total) | 0.2-10 | 0.2-10 | 0.2-10 | 0.2-10 | 0.2-10 | 0.2-10 |
| Other polymers | 0-10 | 0-10 | 0-10 | 0-10 | 0-10 | 0-10 |

Laundry Powder Frame Formulations According to the Invention—Continued: (Wt. %)

| | Bleach containing Powder | | | | | |
|---|---|---|---|---|---|---|
| Alcohol ethoxylate 7EO | 1.2 | 5 | 4 | 0.5 | 0.5 | 0 |
| Coco fatty acid K12-18 | 0 | 0 | 0 | 0.3 | 0 | 0.6 |
| Fatty alcohol ether sulphate | 0 | 3.9 | 4.4 | 1.6 | 0 | 0 |
| Linear alkyl benzene sulphonic acid | 7.6 | 12.1 | 11.5 | 12.2 | 6.5 | 10.4 |
| Bleach activator | 0.2 | 9.5 | 9.5 | 0.5 | 0.8 | 2.2 |
| Percarbonate | 3.6 | 19.4 | 16.6 | 2.2 | 11.5 | 5.8 |
| AcetateNa | 0 | 6.7 | 7.1 | 0.3 | 1 | 0.7 |
| CitrateNa | 0 | 1.6 | 8.2 | 0.3 | 0.9 | 1.7 |
| Na Silicate | 3.6 | 11.3 | 16.4 | 10.2 | 9.1 | 16.5 |
| Na Carbonate | 21.6 | 8.7 | 1.4 | 8 | 22.9 | 14.8 |
| Na Phosphate | 0 | 0 | 0 | 0 | 0 | 0 |
| Na Hydrogen-carbonate | 0.2 | 2.8 | 1.6 | 0.8 | 0.5 | 0.5 |
| Zeolite4A | 1.6 | 1.4 | 2.4 | 1.6 | 1.8 | 2.3 |
| HEDP | 0 | 0.27 | 0.16 | 0 | 0 | 0.17 |
| MGDA | 0 | 0 | 0 | 0 | 0 | 0 |
| One or more enzymes (each) | 0-1.5 | 0-1.5 | 0-1.5 | 0-1.5 | 0-1.5 | 0-1.5 |
| Na Sulfate | 51 | 4 | 6 | 57 | 38 | 37 |
| Na Chloride | 1 | 1 | 0.5 | 1.2 | 0.2 | 1 |

-continued

| | Bleach containing Powder | | | | | |
|---|---|---|---|---|---|---|
| optical brightener | | 0.29 | 0.1 | 0.23 | 0.13 | 0.19 |
| Inventive Polymer(s) (total) | 0.2-10 | 0.2-10 | 0.2-10 | 0.2-10 | 0.2-10 | 0.2-10 |
| Other polymers | 0-10 | 0-10 | 0-10 | 0-10 | 0-10 | 0-10 |

Further typical liquid detergent formulations LD1, LD2 and LD3 are shown in the following three tables: (all numbers in wt. %)

| Liquid detergent 1- LD1 "excellent" detergent | |
|---|---|
| Liquid Detergent Formulation | |
| Sodium alkylbenzene sulfonic acid ($C_{10}$-$C_{13}$) LAS | 9.5 |
| $C_{13}$/$C_{15}$-Oxoalkohol reacted with 7 moles of EO | 4.5 |
| 1,2 propyleneglycol | 6 |
| ethanol | 2 |
| potassium coconut soap | 2.4 |
| NaOH | 2.2 |
| lauryl ether sulphate (Texapon) | 5.0 |
| Sodium citrate | 3 |
| Sokalan HP 20 | 2 |
| Inventive polymer or comparison | 0.2-5 |
| Graft polymer* | 0-2 |
| Water | to 100 |

| Liquid detergent 2- LD2 "medium" performance detergent | |
|---|---|
| Liquid Detergent Formulation | |
| Sodium alkylbenzene sulfonic acid ($C_{10}$-$C_{13}$) | 5.5 |
| $C_{13}$/$C_{15}$-Oxoalkohol reacted with 7 moles of EO | 5.4 |
| 1,2 propyleneglycol | 6 |
| ethanol | 2 |
| potassium coconut soap | 2.4 |
| Monoethanolamine | 2.5 |
| lauryl ether sulphate | 5.4 |
| Sodium citrate | 3 |
| Sokalan HP96 | 2 |
| Inventive polymer or comparison | 0.1-4 |
| Graft polymer* | 0-2 |
| Water | to 100 |

| Liquid detergent 3- LD3 "medium" performance biobased detergent | |
|---|---|
| Liquid Detergent Formulation | |
| MGDA | 5.5 |
| APG, branched C13 Glucoside | 3.5 |
| 1,2 propyleneglycol | 6 |
| ethanol | 2 |
| potassium coconut soap | 4.4 |
| NaOH | 2.2 |
| lauryl ether sulphate | 9.5 |
| Sodium citrate | 3 |

-continued

| Liquid detergent 3- LD3 "medium" performance biobased detergent | |
|---|---|
| Liquid Detergent Formulation | |
| Inventive polymer or comparison | 0.1-4 |
| Graft polymer* | 0-2 |
| Water | to 100 |

All previous three tables: *"graft polymer"=(poly ethylene glycol of Mn 6000 g/mol as graft base, grafted with 60 weight % vinyl acetate (based on total polymer weight; produced following general disclosure of WO2007138054A1)

Liquid manual dish wash formulations according to the invention can include, for example:

| Ingredients | MDW.1 | MDW.2 | MDW.3 | MDW.4 | MDW.5 | MDW.6 | MDW.7 | MDW.8 |
|---|---|---|---|---|---|---|---|---|
| Linear $C_{12}$-$C_{14}$-alkyl-benzenesulfonic acid | 8 | 0 | 6 | 0 | 6 | 0 | 6 | 0 |
| $C_{12}$-$C_{14}$-fatty alcohol x 2 EO sulfate | 8 | 16 | 6 | 12 | 6 | 12 | 6 | 12 |
| Cocamidopropyl betaine | 0 | 0 | 4 | 4 | 0 | 0 | 2 | 2 |
| Lauramine oxide | 0 | 0 | 0 | 0 | 4 | 4 | 2 | 2 |
| 2-Propylheptanol x 4 EO | 0.5 | 0.5 | 0.5 | 0.5 | 0.5 | 0.5 | 0.5 | 0.5 |
| Inventive Polymer(s) (total) | 0.5-5 | 0.5-5 | 0.5-5 | 0.5-5 | 0.5-5 | 0.5-5 | 0.5-5 | 0.5-5 |
| Ethanol | 2 | 2 | 2 | 2 | 2 | 2 | 2 | 2 |
| 2-Phenoxyethanol (preservative) | 1 | 1 | 1 | 1 | 1 | 1 | 1 | 1 |
| Sodium chloride | 1 | 1 | 1 | 1 | 1 | 1 | 1 | 1 |
| Demin. water | add 100 | add 100 | add 100 | add 100 | add 100 | add 100 | add 100 | add 100 |
| Sodium hydroxide | add pH 8 | add pH 8 | add pH 8 | add pH 8 | add pH 8 | add pH 8 | add pH 8 | add pH 8 |

It is preferred, that within the respective laundry detergent, dish wash composition, cleaning composition and/or fabric and home care product, the at least one graft polymer is present at a concentration of from about 0.01% to about 20%, preferably from about 0.05% to 15%, more preferably from about 0.1% to about 10%, and most preferably from about 0.5% to about 5%, in relation to the total weight of such composition or product in relation to the total weight of such composition or product, each in weight % in relation to the total weight of such composition or product, and all numbers in between, and including all ranges resulting from selecting any of the lower limits mentioned and including further 0.2, 0.3, 0.4, 1, 1.5, 2, 2.5, 3, 3.5 and 4, and combing with any of the upper limits mentioned and including 19, 18, 17, 16, 14, 13, 12, 11, 9, 8, 7, and 6.

Detergent Composition

The detergent composition comprises a detersive surfactant and a graft polymer.

The detergent composition is typically a cleaning composition and/or fabric and home care product as such are known to a person skilled in the art. Any composition etc. known to a person skilled in the art, in connection with the respective use, can be employed within the context.

Fabric and home care products are typically suitable for: (a) the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth; (b) the care of dishes, glasses, crockery, cooking pots, pans, utensils, cutlery and the like in automatic, in-machine washing, including detergents, preparatory post treatment and machine cleaning and maintenance products for both the dishwasher, the utilized water and its contents; or (c) manual hand dish washing detergents.

Laundry Detergent Composition: Suitable laundry detergent compositions include laundry detergent powder compositions, laundry beads, laundry detergent liquid compositions, laundry detergent gel compositions, laundry sheets, and water-soluble unit dose laundry detergent compositions.

Fabric Enhancers: Suitable fabric enhancers are liquid fabric enhancers including compact liquid fabric enhancers, and solid fabric enhancers including fabric enhancer beads.

Dish-Washing Detergent Composition: Suitable dish-washing detergent compositions include hand dish-washing detergent compositions and automatic dish-washing detergent compositions. Such as automatic dish-washing powder, tablet and pouches.

Hard Surface Cleansers: Suitable hard surface cleanser compositions include product that can be directly applied onto hard surface, eg. by a spray, and product that can be diluted in water before been applied onto hard surface.

Surfactant System: The compositions comprise a detersive surfactant as a surfactant system, typically in an amount sufficient to provide desired cleaning properties. In some embodiments, the composition comprises, by weight of the composition, from about 1% to about 70% of a surfactant system. In other embodiments, the composition comprises, by weight of the composition, from about 2% to about 60% of the surfactant system. In further embodiments, the composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactants: In some examples, the surfactant system of the composition may comprise from about 1% to about 70%, by weight of the surfactant system, of one or more anionic surfactants. In other examples, the surfactant system of the composition may comprise from about 2% to about 60%, by weight of the surfactant system, of one or more anionic surfactants. In further examples, the surfactant system of the composition may comprise from about 5% to about 30%, by weight of the surfactant system, of one or more anionic surfactants. In further examples, the surfactant system may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Other useful anionic surfactants can include the alkali metal salts of alkyl benzene sulfonates, in which the alkyl group contains from about 9 to about 15 carbon atoms, in straight chain (linear) or branched chain configuration.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are C1-4 alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of C8-18 alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Other suitable anionic surfactant also include alky ethoxyl carboxylate and salts thereof.

Nonionic surfactants: The surfactant system of the composition may comprise a nonionic surfactant. In some examples, the surfactant system comprises up to about 25%, by weight of the surfactant system, of one or more nonionic surfactants, e.g., as a co-surfactant. In some examples, the compositions comprises from about 0.1% to about 15%, by weight of the surfactant system, of one or more nonionic surfactants. In further examples, the compositions comprises from about 0.3% to about 10%, by weight of the surfactant system, of one or more nonionic surfactants.

Suitable nonionic surfactants useful herein can comprise any conventional nonionic surfactant. These can include, for e.g., alkoxylated fatty alcohols and amine oxide surfactants.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched alkyl alkoxylates ($BAE_x$), wherein x is from 1 to 30; alkylpolysaccharides; specifically alkylpolyglycosides; Polyhydroxy fatty acid amides; and ether capped poly(oxyalkylated) alcohol surfactants.

Suitable nonionic surfactants also include those sold under the tradename Lutensol® from BASF.

Anionic/Nonionic Combinations: The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

Cationic Surfactants: The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the compositions of the invention are substantially free of cationic surfactants and surfactants that become cationic below a pH of 7 or below a pH of 6.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Zwitterionic Surfactants: Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$.

Amphoteric Surfactants: Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Branched Surfactants: Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

The branched detersive surfactant may be a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position.

Other Cleaning Additives: The compositions of the invention may also contain other cleaning additives. Suitable cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds suppressors, softeners, and perfumes.

Enzymes: The compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a composition, the aforementioned additional enzymes may be present at levels from about 0.00001% to about 2%, from about 0.0001% to about 1% or even from about 0.001% to about 0.5% enzyme protein by weight of the composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii.*

(b) trypsin-type or chymotrypsin-type proteases, such as trypsin (e.g., of porcine or bovine origin), including the *Fusarium* protease and the chymotrypsin proteases derived from Cellumonas.

(c) metalloproteases, including those derived from *Bacillus amyloliquefaciens.*

Preferred proteases include those derived from *Bacillus gibsonii* or *Bacillus Lentus.*

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP with the following mutations S99D+S101R+S103A+V1041+G159S, hereinafter referred to as BLAP), BLAP R (BLAP with S3T+V41+V199M+V2051+L217D), BLAP X (BLAP with S3T+V41+V2051) and BLAP F49 (BLAP with S3T+V41+A194P+V199M+V2051+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, California).

Other suitable enzyme include phosphodiesterase, such as DNases.

Enzyme Stabilizing System: The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders: The compositions may optionally comprise a builder. Built compositions typically comprise at least about 1% builder, based on the total weight of the composition. Liquid compositions may comprise up to about 10% builder, and in some examples up to about 8% builder, of the total weight of the composition. Granular compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing compositions. Additional suitable builders may be selected from citric acid, lactic acid, fatty acid, polycarboxylate and salt thereof, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O).ySiO_2.zM'O$ wherein M is Na and/or K, M' is Ca and/or Mg; y/x is 0.5 to 2.0; and z/x is 0.005 to 1.0.

Alternatively, the composition may be substantially free of builder.

Structurant/Thickeners: Suitable structurant/thickeners include:

i. Di-benzylidene Polyol Acetal Derivative
ii. Bacterial Cellulose
iii. Coated Bacterial Cellulose
iv. Cellulose fibers non-bacterial cellulose derived
v. Non-Polymeric Crystalline Hydroxyl-Functional Materials
vi. Polymeric Structuring Agents
vii. Di-amido-gellants
viii. Any combination of above.

Polymeric Dispersing Agents: The compositions described herein may include from about 0.01% to about 10.0%, typically from about 0.1% to about 5%, in some aspects from about 0.2% to about 3.0%, by weight of the composition, of a polymeric dispersing agents.

The composition may comprise one or more polymeric dispersing agents. Examples are carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers; polycarboxylates containing sulphonated monomers.

The composition may comprise one or more amphiphilic cleaning polymers such as the compound having the following general structure: $bis((C2H_5O)(C_2H_4O)n)(CH_3)—N^+—C_xH_{2x}—N^+—(CH_3)-bis((C_2H_5O)(C_2H_4O)n)$, wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers comprise a core structure and a plurality of alkoxylate groups attached to that core structure. These may comprise alkoxylated polyalkylenimines, for example, having an inner polyethylene oxide block and an outer polypropylene oxide block.

Alkoxylated polyamines may be used for grease and particulate removal. Such compounds may include, but are not limited to, ethoxylated polyethyleneimine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF.

The composition may comprise random graft polymers comprising a hydrophilic backbone comprising monomers, for example, unsaturated $C_1$-$C_6$ carboxylic acids, ethers, alcohols, aldehydes, ketones, esters, sugar units including polyglucans and other polysaccharides, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used being dibenzoyl peroxide, dilauroyl peroxide or diacetyl peroxide.

The composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Carboxylate polymer—The composition may also include one or more carboxylate polymers such as a maleate/acrylate random copolymer or polyacrylate homopolymer. A suitable carboxylate polymer is a polyacrylate homopolymer having a molecular weight of from 4,000 Da to 9,000 Da, or from 6,000 Da to 9,000 Da. Another suitable carboxylate polymer is a copolymer of acrylic acid and maleic acid having a molecular weight of from 50,000 Da to 120,000 Da, or from 60,000 Da to 80,000 Da.

Suitable carboxylate polymers can also comprises ether moieties and sulfonate moieties.

Suitable carboxylate polymer can be alkoxylated polycarboxylates. Chemically, these materials comprise polyacrylates having one ethoxy side-chain per every 7-8 acrylate units. The side-chains are of the formula $-(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but may be in the range of about 2000 to about 50,000.

Soil Release Polymer: The compositions described herein may include from about 0.01% to about 10.0%, typically from about 0.1% to about 5%, in some aspects from about 0.2% to about 3.0%, by weight of the composition, of a soil release polymer (also known as a polymeric soil release agents or "SRA").

Soil release polymers typically have hydrophilic segments to hydrophilize the surface of hydrophobic fibers (such as polyester and nylon), and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures. It is also believed that facilitating the release of soils helps to improve or maintain the wicking properties of a fabric.

The structure and charge distribution of the soil release polymer may be tailored for application to different fibers or textile types and for formulation in different detergent or detergent additive products. Soil release polymers may be linear, branched, or star-shaped.

Soil release polymers may also include a variety of charged units (e.g., anionic or cationic units) and/or non-charged (e.g., nonionic) monomer units. Typically, a nonionic SRP may be particularly preferred when the SRP is used in combination with a cationic fabric conditioning active, such as a quaternary ammonium ester compound, in order to avoid potentially negative interactions between the SRP and the cationic active.

Soil release polymer may include an end capping moiety, which is especially effective in controlling the molecular weight of the polymer or altering the physical or surface-active properties of the polymer.

One preferred class of suitable soil release polymers include terephthalate-derived polyester polymers, which comprise structure unit (I) and/or (II):

$$-[(OCHR^1-CHR^2)_a-O-OC-Ar-CO-]_d \quad (I)$$

$$-[(OCHR^3-CHR^4)_b-O-OC\text{-}sAr\text{-}CO\text{-}]_e \quad (II)$$

wherein:

a, b are from 1 to 200;

d, e are from 1 to 50;

Ar is a 1,4-substituted phenylene;

sAr is 1,3-substituted phenylene substituted in position 5 with $SO_3M$;

M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$ are independently selected from H or $C_1$-$C_{18}$ n-alkyl or iso-alkyl;

Optionally, the polymer further comprises one or more terminal group (III) derived from polyalkylene glycolmonoalkylethers, preferably selected from structure (IV-a)

$$-O-[C_2H_4-O]_c-[C_3H_6-O]_d-[C_4H_8-O]_e-R_7 \quad (IV\text{-}a)$$

wherein:

$R_7$ is a linear or branched $C_{1-30}$ alkyl, $C_2$-$C_{30}$ alkenyl, or a cycloalkyl group with 5 to 9 carbon atoms, or a $C_8$-$C_{30}$ aryl group, or a $C_6$-$C_{30}$ arylalkyl group; preferably $C_1$-4 alkyl, more preferably methyl; and c, d and e are, based on molar average, a number independently selected from 0 to 200, where the sum of c+d+e is from 2 to 500, wherein the $[C_2H_4-O]$, $[C_3H_6-O]$ and $[C_4H_8-O]$ groups of the terminal group (IV-a) may be arranged blockwise, alternating, periodically and/or statistically, preferably blockwise and/or statistically, either of the $[C_2H_4-O]$, $[C_3H_6-O]$ and $[C_4H_8-O]$ groups of the terminal group (IV-a) can be linked to $-R_7$ and/or $-O$.

Optionally, the polymer further comprises one or more anionic terminal unit (IV) and/or (V) as described in EP3222647. Where M is a counterion selected from Na, Li, K, Mg/2, Ca/2, Al/3, ammonium, mono-, di-, tri-, or tetraalkylammonium wherein the alkyl groups are C1-C18 alkyl or C2-C10 hydroxyalkyl, or mixtures thereof.

$$-O-CH_2CH_2-SO_3M \quad (IV)$$

(V)

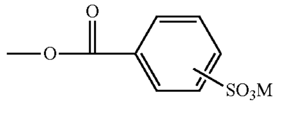

Optionally, the polymer may comprise crosslinking multifunctional structural unit which having at least three functional groups capable of the esterification reaction. The functional which may be for example acid-, alcohol-, ester-, anhydride- or epoxy groups, etc.

Optionally, the polymer may comprise other di- or poly-carboxylic acids or their salts or their (di)alkylesters can be used in the polyesters of the invention, such as, naphthalene-1,4-dicarboxylic acid, naphthalene-2,6-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their ($C_1$-$C_4$)-(di)alkyl esters and more preferably their (di)methyl esters, or mixtures thereof.

Preferably, suitable terephthalate-derived soil release polymers are nonionic, which does not comprise above structure (II). A further particular preferred nonionic terephthalate-derived soil release polymer has a structure according to formula below:

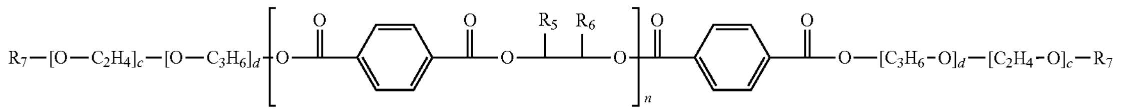

wherein:

$R_5$ and $R_6$ is independently selected from H or $CH_3$. More preferably, one of the $R_5$ and $R_6$ is H, and another is $CH_3$.

c, d are, based on molar average, a number independently selected from 0 to 200, where the sum of c+d is from 2 to 400, More preferably, d is from 0 to 50, c is from 1 to 200, More preferably, d is 1 to 10, c is 5 to 150, $R_7$ is $C_{1-4}$ alkyl and more preferably methyl, n is, based on molar average, from 1 to 50.

One example of most preferred above suitable terephthalate-derived soil release polymers has one of the $R_5$ and $R_6$ is H, and another is $CH_3$; d is 0; c is from 5-100 and $R_7$ is methyl.

Suitable terephthalate-derived soil release polymers may be also described as sulphonated and unsulphonated PET/POET (polyethylene terephthalate/polyoxyethylene terephthalate) polymers, both end-capped and non-end-capped. Example of suitable soil release polymers include TexCare® polymers, including TexCare® SRA-100, SRA-300, SRN-100, SRN-170, SRN-240, SRN-260, SRN-260 life, SRN-300, and SRN-325, supplied by Clariant.

Other suitable terephthalate-derived soil release polymers are described in patent WO2014019903, WO2014019658 and WO2014019659.

Another class of soil release polymer also include modified cellulose. Suitable modified cellulose may include nonionic modified cellulose derivatives such as cellulose alkyl ether and cellulose hydroxyalkyl ethers. Example of such cellulose alkyl ether and cellulose hydroxyalkyl ethers include methyl cellulose, ethyl cellulose, hydroxyethyl cellulose, hydroxypropyl cellulose, hydroxypropyl methylcellulose, hydroxybutyl methyl cellulose. In some embodiment, the modified cellulose may comprise hydrocarbon of $C_4$ or above, preferred length of the alkyl group may be $C_4$, $C_6$, $C_8$, $C_{10}$, $C_{12}$, $C_{14}$, $C_{16}$, $C_{18}$; example of suitable modified cellulose are described in WO2019111948 and WO2019111949. In some embodiment, the modified cellulose may comprise additional cationic modification, example of suitable modified cellulose with additional cationic modification are described in WO2019111946 and WO2019111947.

Other suitable soil release polymers include sulfoethyl cellulose which are mentioned in WO2014124872; cellulose carbamates which are mentioned in WO2015044061; modified 6-desoxy-6-amino-celluloses which are mentioned in WO2017137295; Xylose carbamates which are mentioned in WO2019243071; carboxy or sulfo-alkylated pullulan which are mentioned in WO2019243072; carboxy or sulfo-alkylated chitosan which are mentioned in WO2019243108.

Other examples of commercial soil release polymers are the REPEL-O-TEX® line of polymers supplied by Rhodia, including REPEL-O-TEX® SF, SF-2, and SRP6. Other suitable soil release polymers are Marloquest® polymers, such as Marloquest® SL, HSCB, L235M, B, and G82, supplied by Sasol. Further suitable soil release polymers of a different type include the commercially available material ZELCON 5126 (from DuPont) and MILEASE T (from ICI), Sorez 100 (from ISP).

Cellulosic Polymer: The compositions described herein may include from about 0.1% to about 10%, typically from about 0.5% to about 7%, in some aspects from about 3% to about 5%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. In some aspects, the cellulosic polymer is selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix®V (sold by CP Kelko).

Additional Amines: Additional amines may be used in the compositions described herein for added removal of grease and particulates from soiled materials. The compositions described herein may comprise from about 0.1% to about 10%, in some examples, from about 0.1% to about 4%, and in other examples, from about 0.1% to about 2%, by weight of the composition, of additional amines. Non-limiting examples of additional amines may include, but are not limited to, polyamines, oligoamines, triamines, diamines, pentamines, tetraamines, or combinations thereof. Specific examples of suitable additional amines include tetraethylenepentamine, triethylenetetraamine, diethylenetriamine, or a mixture thereof.

Bleaching Compounds, Bleaching Agents, Bleach Activators, and Bleach Catalysts: The compositions described herein may contain bleaching agents or bleaching compositions containing a bleaching agent and one or more bleach activators. Bleaching agents may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the bleaching composition comprising the bleaching agent plus bleach activator.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in compositions. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the compositions described herein will typically contain from about 0.025% to about 1.25%, by weight of the composition, of such bleaches, and in some examples, of sulfonate zinc phthalocyanine.

The composition may comprises bleach boost agent, such as acyl hydrozone and imidazolines.

Brighteners: Optical brighteners or other brightening or whitening agents may be incorporated at levels of from about 0.01% to about 1.2%, by weight of the composition, into the compositions described herein. Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium 4,4'-bis{[4-anilino-6-(N-2-bis-hydroxyethyl)-s-triazine-2-yl]-amino}-2,2'-stilbenedisulonate (commercially available under the tradename Tinopal UNPA-GX by Ciba-Geigy Corporation), di sodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agents: The compositions may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Dye Transfer Inhibiting Agents: The compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents: The compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

The chelant may be present in the compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the composition.

Aminocarboxylates useful as chelating agents include, but are not limited to ethylenediaminetetracetates (EDTA); ethylenediamine-N,N'-disuccinic acid (EDDS), 1-hydroxyethylidene-1,1-diphosphonic acid (HEDP), N-(hydroxyethyl) ethylenediaminetriacetates (HEDTA); A); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Encapsulates: The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

Liquid Laundry Detergent Composition. The fabric and home care product can be a laundry detergent composition, such as a liquid laundry detergent composition. Suitable liquid laundry detergent compositions can comprise a non-soap surfactant, wherein the non-soap surfactant comprises an anionic non-soap surfactant and a non-ionic surfactant. The laundry detergent composition can comprise from 10% to 60%, or from 20% to 55% by weight of the laundry detergent composition of the non-soap surfactant. The non-soap anionic surfactant to nonionic surfactant are from 1:1 to 20:1, from 1.5:1 to 17.5:1, from 2:1 to 15:1, or from 2.5:1 to 13:1. Suitable non-soap anionic surfactants include linear alkylbenzene sulphonate, alkyl sulphate or a mixture thereof. The weight ratio of linear alkylbenzene sulphonate to alkyl sulphate can be from 1:2 to 9:1, from 1:1 to 7:1, from 1:1 to 5:1, or from 1:1 to 4:1. Suitable linear alkylbenzene sulphonates are $C_{10}$-$C_{16}$ alkyl benzene sulfonic acids, or $C_{11}$-$C_{14}$ alkyl benzene sulfonic acids. Suitable alkyl sulphate anionic surfactants include alkoxylated alkyl sulphates, non-alkoxylated alkyl sulphates, and mixture thereof. Preferably, the HLAS surfactant comprises greater than 50% $C_{12}$, preferably greater than 60%, preferably greater than 70% $C_{12}$, more preferably greater than 75% $C_{12}$. Suitable alkoxylated alkyl sulphate anionic surfactants include ethoxylated alkyl sulphate anionic surfactants. Suitable alkyl sulphate anionic surfactants include ethoxylated alkyl sulphate anionic surfactant with a mol average degree of ethoxylation of from 1 to 5, from 1 to 3, or from 2 to 3. The alkyl alkoxylated sulfate may have a broad alkoxy distribution or a peaked alkoxy distribution. The alkyl portion of the AES may include, on average, from 13.7 to about 16 or from 13.9 to 14.6 carbons atoms. At least about 50% or at least about 60% of the AES molecule may include having an alkyl portion having 14 or more carbon atoms, preferable from 14 to 18, or from 14 to 17, or from 14 to 16, or from 14 to 15 carbon atoms. The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. The alkyl fraction of the alkyl sulphate anionic surfactant can be derived from fatty alcohols, oxo-synthesized alcohols, Guerbet alcohols, or mixtures thereof. Preferred alkyl sulfates include optionally ethoxylated alcohol sulfates including 2-alkyl branched primary alcohol sulfates especially 2-branched $C_{12-15}$ primary alcohol sulfates, linear primary alcohol sulfates especially linear $C_{12-14}$ primary alcohol sulfates, and mixtures thereof. The laundry detergent composition can comprise from 10% to 50%, or from 15% to 45%, or from 20% to 40%, or from 30% to 40% by weight of the laundry detergent composition of the non-soap anionic surfactant.

Suitable non-ionic surfactants can be selected from alcohol broad or narrow range alkoxylates, an oxo-synthesised alcohol alkoxylate, Guerbet alcohol alkoxylates, alkyl phenol alcohol alkoxylates, or a mixture thereof. The laundry detergent composition can comprise from 0.01% to 10%, from 0.01% to 8%, from 0.1% to 6%, or from 0.15% to 5% by weight of the liquid laundry detergent composition of a non-ionic surfactant.

The laundry detergent composition comprises from 1.5% to 20%, or from 2% to 15%, or from 3% to 10%, or from 4% to 8% by weight of the laundry detergent composition of soap, such as a fatty acid salt. Such soaps can be amine neutralized, for instance using an alkanolamine such as monoethanolamine.

The laundry detergent composition can comprises an adjunct ingredient selected from the group comprising builders including citrate, enzymes, bleach, bleach catalyst, dye, hueing dye, Leuco dyes, brightener, cleaning polymers including alkoxylated polyamines and polyethyleneimines, amphiphilic copolymers, soil release polymer, surfactant, solvent, dye transfer inhibitors, chelant, diamines, perfume, encapsulated perfume, polycarboxylates, structurant, pH trimming agents, antioxidants, antibacterial, antimicrobial agents, preservatives and mixtures thereof.

The laundry detergent composition can have a pH of from 2 to 11, or from 6.5 to 8.9, or from 7 to 8, wherein the pH of the laundry detergent composition is measured at a 10% product concentration in demineralized water at 20° C.

The liquid laundry detergent composition can be Newtonian or non-Newtonian, preferably non-Newtonian.

For liquid laundry detergent compositions, the composition can comprise from 5% to 99%, or from 15% to 90%, or from 25% to 80% by weight of the liquid detergent composition of water.

The detergent composition according to the invention can be liquid laundry detergent composition. The following are exemplary liquid laundry detergent formulations. Preferably the liquid laundry detergent composition comprises from between 0.1% and 4.0%, preferably between 0.5% and 3%, more preferably between 1% to 2.5% by weight of the detergent composition of the sulfatized esteramine according to the invention.

TABLE 1

| Raw Material | Comp. 1 % wt | Comp. 2 % wt | Comp. 3 % wt | Comp. 4 % wt |
|---|---|---|---|---|
| Branched Alkyl Sulfate | 0.0 | 5.3 | 0.0 | 5.3 |
| Sodium Lauryl Sulfate | 0.0 | 3.0 | 0.0 | 3.0 |
| Linear alkylbenzene sulfonate | 18.0 | 5.0 | 6.0 | 5.0 |
| AE3S Ethoxylated alkyl sulphate with an average degree of ethoxylation of 3 | 5.0 | 0.0 | 1.3 | 0.0 |
| C25AES Ethoxylated alkyl sulphate with an average degree of ethoxylation of 2.5[1] | 0.0 | 3.0 | 1.4 | 0.0 |
| Amine oxide | 0.7 | 1.0 | 0.4 | 0.8 |
| C24 alkyl ethoxylate (EO7) | 8.4 | 0.0 | 12.9 | 5.0 |
| C24 alkyl ethoxylate (EO9) | 0.0 | 8.7 | 0.0 | 3.7 |
| C45 alkyl ethoxylate (EO7) | 0.0 | 2.7 | 0.0 | 2.7 |
| Citric acid | 2.9 | 2.3 | 0.7 | 2.3 |
| Palm kernel fatty acid | 0.0 | 1.0 | 0.0 | 1.0 |

TABLE 1-continued

| Raw Material | Comp. 1 % wt | Comp. 2 % wt | Comp. 3 % wt | Comp. 4 % wt |
|---|---|---|---|---|
| Topped kernel fatty acid | 2.9 | 0.0 | 2.3 | 0.0 |
| Mannanase | 0.0017 | 0.0017 | 0.0017 | 0.0017 |
| Pectawash | 0.00342 | 0.00342 | 0.00342 | 0.00342 |
| Amylase | 0.00766 | 0.00766 | 0.00766 | 0.00766 |
| Protease | 0.07706 | 0.07706 | 0.07706 | 0.07706 |
| Nuclease[3] | 0.010 | 0.01 | 0.01 | 0.01 |
| Sodium tetraborate | 0.0 | 1.7 | 0.0 | 1.7 |
| MEA-Boric Acid Salt | 0.0 | 0.0 | 0.8 | 0.0 |
| Calcium/sodium formate | 0.0 | 0.04 | 0.01 | 0.04 |
| Sodium/Calcium Chloride | 0.04 | 0.02 | 0.03 | 0.02 |
| Ethoxylated polyethyleneimine[2] | 0.0 | 2.0 | 1.1 | 2.0 |
| Amphiphilic graft copolymer | 1.5 | 0.0 | 0.0 | 0.0 |
| Ethoxylated-Propoxylated polyethyleneimine | 0.0 | 2.0 | 0.8 | 2.0 |
| Zwitterionic polyamine | 0.5 | 0.0 | 0.0 | 0.0 |
| Nonionic polyester terephthalate | 1.0 | 1.0 | 1.0 | 1.0 |
| Graft polymer of the present invention | 1.0 | 2.0 | 1.5 | 2.5 |
| DTPA | 0.0 | 0.1 | 0.2 | 0.1 |
| EDDS | 0.1 | 0.0 | 0.0 | 0.0 |
| GLDA | 0.4 | 0.3 | 0.1 | 0.0 |
| MGDA | 0.2 | 0.0 | 0.0 | 0.5 |
| Diethylene triamine penta(methyl phosphonic) acid (DTPMP) | 1.1 | 0.0 | 0.0 | 0.0 |
| Fluorescent Brightener[8] | 0.06 | 0.22 | 0.03 | 0.15 |
| Ethanol | 0.7 | 1.9 | 0.0 | 1.9 |
| propylene glycol | 5.5 | 5.5 | 0.33 | 5.5 |
| Sorbitol | 0.01 | 0.01 | 0.0 | 0.01 |
| Monoethanolamine | 0.2 | 0.2 | 0.6 | 0.2 |
| DETA | 0.1 | 0.08 | 0.0 | 0.08 |
| Antioxidant 1 | 0.0 | 0.1 | 0.1 | 0.1 |
| Antioxidant 2 | 0.1 | 0.0 | 0.0 | 0.0 |
| Hygiene Agent | 0.0 | 0.0 | 0.05 | 0.0 |
| NaOH | 4.7 | 4.7 | 1.1 | 4.7 |
| NaCS | 3.2 | 1.7 | 3.2 | 1.7 |
| Hydrogenated Castor Oil | 0.2 | 0.1 | 0.12 | 0.1 |
| Aesthetic dye | 0.10 | 0.01 | 0.006 | 0.01 |
| Leuco dye | 0.05 | 0.01 | 0.0 | 0.01 |
| Perfume | 2.0 | 1.3 | 0.5 | 1.3 |
| Perfume microcapsules | 0.5 | 0.05 | 0.1 | 0.05 |
| Silicone antifoam[7] | 0.02 | 0.01 | 0.0 | 0.01 |
| Phenyloxy ethanol | 0.002 | 0.01 | 0.0 | 0.01 |
| Hueing dye | 0.01 | 0.1 | 0.05 | 0.1 |
| Water & miscellaneous | balance | balance | balance | balance |

Description of super-script numbers:

[1]C12-15EO2.5S AlkylethoxySulfate where the alkyl portion of AES includes from about 13.9 to 14.6 carbon atoms

[2]PE-20 commercially available from BASF

[3]Nuclease enzyme is as claimed in co-pending European application 19219568.3

4 Antioxidant 1 is 3,5-bis(1,1-dimethylethyl)-4-hydroxybenzenepropanoic acid, methyl ester [6386-38-5]

5 Antioxidant 2 is Tinogard TS commercially available from BASF

6 Hygiene Agent is agent is Tinosan HP 100 commercially available from BASF

[7]Dow Corning supplied antifoam blend 80-92% ethylmethyl, methyl(2-phenyl propyl)siloxane; 5-14% MQ Resin in octyl stearate a 3-7% modified silica.

[8]Fluorescent Brightener is disodium 4,4'-bis{[4-anilino-6-morpholino-s-triazin-2-yl]-amino}-2,2'-stilbene-disulfonate or 2,2'-([1,1'-Biphenyl]-4,4'-diyldi-2,1-ethenediyl)bis-benzenesulfonic acid disodium salt.

Water Soluble Unit Dose Article.

The fabric and home care product can be a water-soluble unit dose article. The water-soluble unit dose article comprises at least one water-soluble film orientated to create at least one unit dose internal compartment, wherein the at least one unit dose internal compartment comprises a detergent composition. The water-soluble film preferably comprises polyvinyl alcohol homopolymer or polyvinyl alcohol copolymer, for example a blend of polyvinylalcohol homopolymers and/or polyvinylalcohol copolymers, for example copolymers selected from sulphonated and carboxylated anionic polyvinylalcohol copolymers especially carboxylated anionic polyvinylalcohol copolymers, for example a blend of a polyvinylalcohol homopolymer and a carboxylated anionic polyvinylalcohol copolymer. In some examples water soluble films are those supplied by Monosol under the trade references M8630, M8900, M8779, M8310. The detergent product comprises a detergent composition, more preferably a laundry detergent composition. Preferably the laundry detergent composition enclosed in the water-soluble unit dose article comprises from between 0.1% and 8%, preferably between 0.5% and 7%, more preferably 1.0% to 6.0% by weight of the detergent composition of the sulfatized esteramine Preferably the soluble unit dose laundry detergent composition comprises a non-soap surfactant, wherein the non-soap surfactant comprises an anionic non-soap surfactant and a non-ionic surfactant. More preferably, the laundry detergent composition comprises between 10% and 60%, or between 20% and 55% by weight of the laundry detergent composition of the non-soap surfactant. The weight ratio of non-soap anionic surfactant to nonionic surfactant preferably is from 1:1 to 20:1, from 1.5:1 to 17.5:1, from 2:1 to 15:1, or from 2.5:1 to 13:1. The non-soap anionic surfactants preferably comprise linear alkylbenzene sulphonate, alkyl sulphate or a mixture thereof. The weight ratio of linear alkylbenzene sulphonate to alkyl sulphate preferably is from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactants comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. Preferably the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesized alcohol alkoxylate, Guerbet alcohol alkoxylates, alkyl phenol alcohol alkoxylates, or a mixture thereof. Preferably, the laundry detergent composition comprises between 0.01% and 10%, or between 0.01% and 8%, or between 0.1% and 6%, or between 0.15% and 5% by weight of the liquid laundry detergent composition of a non-ionic surfactant. Preferably, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine preferably monoethanolamine. Preferably the liquid laundry detergent composition comprises less than 15%, or less than 12% by weight of the liquid laundry detergent composition of water. Preferably, the laundry detergent composition comprises between 10% and 40%, or between 15% and 30% by weight of the liquid laundry detergent composition of a non-aqueous solvent selected from 1,2-propanediol, dipropylene glycol, tripropyleneglycol, glycerol, sorbitol, polyethylene glycol or a mixture thereof. Preferably the liquid laundry detergent composition comprises from 0.1% to 10%, preferably from 0.5% to 8% by weight of the detergent composition of further soil release polymers, preferably selected from the group of nonionic and/or anionically modified polyester terephthalate soil release polymers such as commercially available under the Texcare brand name from Clariant, amphiphilic graft polymers such as those based on polyalkylene oxides and vinyl esters, polyalkoxylated polyethyleneimines, and mixtures thereof. Preferably the liquid detergent composition further comprises from 0.1% to 10% preferably from 1% to 5% of a chelant. In some examples, the laundry detergent composition comprises an adjunct ingredient selected from the group comprising builders including citrate, enzymes, bleach, bleach catalyst, dye, hueing dye, brightener, cleaning polymers including (zwitterionic) alkoxylated polyamines, surfactant, solvent, dye transfer inhibitors, perfume, encapsulated perfume, polycarboxylates, structurant, pH trimming agents, and mixtures thereof. Preferably, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian, preferably non-Newtonian.

The following is an exemplary water soluble unit dose formulations. The composition can be part of a single chamber water soluble unit dose article or can be split over multiple compartments resulting in below "averaged across compartments" full article composition. The composition is enclosed within a polyvinyl alcohol based water soluble, the polyvinyl alcohol comprising a blend of a polyvinyl alcohol homopolymer and an anionic e.g. carboxylated polyvinyl alcohol copolymer.

TABLE 2

| Ingredients | Comp. 4 (wt %) |
|---|---|
| Fatty alcohol ethoxylate non-ionic surfactant, $C_{12-14}$ average degree of ethoxylation of 7 | 3.8 |
| Lutensol XL 100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme* (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine (Lutensol FP620 - PEI600EO20) | 1.4 |
| Amphiphilic graft copolymer** | 1.6 |
| Zwitterionic polyamine (Lutensit Z96) | 1.5 |
| Anionic polyester terephthalate (Texcare SRA300) | 0.6 |
| Graft polymer of the present invention | 3.0 |
| HEDP | 2.2 |
| Brightener 49 | 0.4 |
| Silicone anti-foam | 0.3 |
| Hueing dye | 0.05 |
| 1,2 PropaneDiol | 11.0 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| $K_2SO_3$ | 0.4 |
| $MgCl_2$ | 0.3 |
| water | 10.5 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

Description of super-scripts:

*Nuclease enzyme is as claimed in co-pending European application 19219568.3

**polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Hand Dishwashing Liquid Composition.

The fabric and home care product can be a dishwashing detergent composition, such as a hand dishwashing detergent composition, more preferably a liquid hand dishwashing detergent composition. Preferably the liquid hand dishwashing detergent composition comprises from between 0.1% and 5.0%, preferably between 0.5% and 4%, more preferably 1.0% to 3.0% by weight of the detergent composition of the sulfatized esteramine. The liquid hand-dishwashing detergent composition preferably is an aqueous composition, comprising from 50% to 90%, preferably from 60% to 75%, by weight of the total composition of water. Preferably the pH of the detergent composition of the invention, measured as a 10% product concentration in demineralized water at 20° C., is adjusted to between 3 and 14, more preferably between 4 and 13, more preferably between 6 and 12 and most preferably between 8 and 10. The composition can be Newtonian or non-Newtonian, preferably Newtonian. Preferably, the composition has a viscosity of from 10 mPas to 10,000 mPas, preferably from 100 mPas to 5,000 mPas, more preferably from 300 mPas to 2,000 mPas, or most preferably from 500 mPas to 1,500 mPas, alternatively combinations thereof. The viscosity is measured at 20° C. with a Brookfield RT Viscometer using spindle 31 with the RPM of the viscometer adjusted to achieve a torque of between 40% and 60%.

The composition comprises from 5% to 50%, preferably from 8% to 45%, more preferably from 15% to 40%, by weight of the total composition of a surfactant system. The surfactant system preferably comprises from 60% to 90%, more preferably from 70% to 80% by weight of the surfactant system of an anionic surfactant. Alkyl sulphated anionic surfactants are preferred, particularly those selected from the group consisting of: alkyl sulphate, alkyl alkoxy sulphate preferably alkyl ethoxy sulphate, and mixtures thereof. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant preferably has an average degree of alkoxylation preferably ethoxylation, of less than 5, preferably less than 3, more preferably from 0.5 to 2.0, most preferably from 0.5 to 0.9. The alkyl sulphate anionic surfactant preferably has a weight average degree of branching of more than 10%, preferably more than 20%, more preferably more than 30%, even more preferably between 30% and 60%, most preferably between 30% and 50%. Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company.

The surfactant system preferably comprises from 0.1% to 20%, more preferably from 0.5% to 15% and especially from 2% to 10% by weight of the liquid hand dishwashing detergent composition of a co-surfactant. Preferred co-surfactants are selected from the group consisting of an amphoteric surfactant, a zwitterionic surfactant, and mixtures thereof. The anionic surfactant to the co-surfactant weight ratio can be from 1:1 to 8:1, preferably from 2:1 to 5:1, more preferably from 2.5:1 to 4:1. The co-surfactant is preferably an amphoteric surfactant, more preferably an amine oxide surfactant. Preferably, the amine oxide surfactant is selected from the group consisting of: alkyl dimethyl amine oxide, alkyl amido propyl dimethyl amine oxide, and mixtures thereof, most preferably $C_{12}$-$C_{14}$ alkyl dimethyl amine oxide. Suitable zwitterionic surfactants include betaine surfactants, preferably cocamidopropyl betaine.

Preferably, the surfactant system of the composition further comprises from 1% to 25%, preferably from 1.25% to 20%, more preferably from 1.5% to 15%, most preferably from 1.5% to 5%, by weight of the surfactant system, of a non-ionic surfactant. Suitable nonionic surfactants can be selected from the group consisting of: alkoxylated non-ionic surfactant, alkyl polyglucoside ("APG") surfactant, and mixtures thereof. Suitable alkoxylated non-ionic surfactants can be linear or branched, primary or secondary alkyl alkoxylated preferably alkyl ethoxylated non-ionic surfactants comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. $C_8$-$C_{16}$ alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

The liquid hand dishwashing detergent composition herein may optionally comprise a number of other adjunct ingredients such as builders (e.g., preferably citrate), chelants (e.g., preferably GLDA), conditioning polymers, cleaning polymers including polyalkoxylated polyalkylene imines, surface modifying polymers, soil flocculating polymers, sudsing polymers including EO-PO-EO triblock copolymers, grease cleaning amines including cyclic polyamines, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, organic solvents, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike).

The following is an exemplary liquid hand dishwashing detergent formulation. The formulation can be made through standard mixing of the individual components.

TABLE 3

| As 100% active | Comp. 5 (wt %) |
|---|---|
| C1213AE0.6S anionic surfactant (Avg. branching: 37.84%) | 19.6 |
| C1214 dimethyl amine oxide | 6.5 |
| Alcohol ethoxylate nonionic surfactant (Neodol 91/8) | 1.0 |
| Alkoxylated polyethyleneimine (PEI600EO24PO16) | 0.2 |
| Graft polymer of the present invention | 1.0 |
| Ethanol | 2.4 |
| NaCl | 0.7 |
| Polypropyleneglycol (MW2000) | 0.9 |
| Water + Minor ingredients (perfume, dye, preservatives) | Balance to 100 |
| pH (at 10% product concentration in demineralized water - with NaOH trimming) | 9.0 |

Solid Free-Flowing Particulate Laundry Detergent Composition.

The fabric and home care product can be solid free-flowing particulate laundry detergent composition. The following is an exemplary solid free-flowing particulate laundry detergent composition.

TABLE 4

| Ingredient | Comp. 6 (wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwitterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Graft polymer of the present invention | From 0.1 wt % to 4 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminum sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |

TABLE 4-continued

| Ingredient | Comp. 6 (wt %) |
|---|---|
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes herein, washing includes, but is not limited to, scrubbing, wiping and mechanical agitation.

As will be appreciated by one skilled in the art, the cleaning compositions are ideally suited for use in home care (hard surface cleaning compositions) and/or laundry applications.

The composition solution pH is chosen to be the most complimentary to a target surface to be cleaned spanning broad range of pH, from about 3 to about 11. For personal care such as skin and hair cleaning pH of such composition preferably has a pH from about 5 to about 8 for laundry cleaning compositions pH of from about 5 to about 11. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition. As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions are ideally suited for use in liquid dish cleaning compositions. A method for using a liquid dish composition comprises the steps of contacting soiled dishes with an effective amount, typically from about 0.5 ml. to about 20 ml. (per 25 dishes being treated) of the liquid dish cleaning composition diluted in water.

The present invention also includes methods for use such graft polymer for improved soil suspension performance, soil release performance, stain removal performance, anti-redeposition performance, and/or malodor control performance.

The following specific embodiments additionally form part of this invention:

Embodiment 1

A detergent composition comprising a detersive surfactant and a graft polymer comprising:

(A) 20 to 95%, preferably 30 to 90%, more preferably 40 to 85%, most preferably 50 to 80% of a polymer backbone as a graft base,
which is obtainable by polymerization of ethylene oxide,
wherein the molecular weight of the polymer backbone Mn in g/mol is within 500 to 5000, preferably not more than 3500, more preferably not more than 3000, even more preferably not more than 2500, and most preferably not more than 2000, such as not more than 1800, and (B) 5 to 80%, preferably 10 to 70%, more preferably 15 to 60%, most preferably 20 to 50%, of polymeric sidechains (B) grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5, preferably less than 0.4, more preferably less than 0.3, even more preferably less than 0.2, and most preferably less than 0.1

(with all percentages as weight percent in relation to the total weight of the graft polymer).

Embodiment 2

A detergent composition comprising a detersive surfactant and a graft polymer comprising:

(A) a polymer backbone as a graft base (A),
which is obtainable by polymerization of ethylene oxide, and (B) polymeric sidechains grafted onto the polymer backbone, wherein said polymeric sidechains (B) are obtainable by polymerization of at least one vinyl ester monomer (B1), and optionally at least one other monomer (B2), wherein—if present—the weight ratio of monomer (B2) to monomer (B1) is less than 0.5, preferably less than 0.4, more preferably less than 0.3, even more preferably less than 0.2, and most preferably less than 0.1, and wherein the product of formula $$P = [\text{molecular weight of the polymer backbone } Mn \text{ in g/mol}] \times [\text{percentage of amount of polymeric sidechains } (B) \text{ based on total polymer weight, with polymer weight being set to "1" and the percentage of amount of } (B) \text{ as fraction thereof}]$$

is in the range of from 50 to 1500, preferably not more than 1200, more preferably not more than 1000, even more preferably not more than 800, and most preferably not more than 600 such as not more than 400, or even not more than 300, and preferably at least 100, and more preferably at least 120.

Embodiment 3

The detergent composition according to embodiment 1 or 2, wherein i) the polymer backbone (A) may be bare as the two end-groups one or two hydroxy-groups or may be capped on one end or both ends with C1 to C22-alkyl groups, preferably C1 to C4 alkyl groups, and/or
ii) the graft polymer has a polydispersity Mw/Mn of <5, preferably <3.5, more preferably <3, and most preferably in the range from 1.0 to 2.5 (with Mw=weight average molecular weight and Mn=number average molecular weight [g/mol/g/mol]), and/or
iii) essentially no monomer (B2) is employed for the polymerization to obtain the side chains (B).

Embodiment 4

The detergent composition according to any of embodiments 1 to 3, wherein at least 10 weight percent of the total amount of vinyl ester monomer (B1) is selected from vinyl acetate, vinyl propionate and vinyl laurate, more preferably from vinyl acetate and vinyl laurate, and most preferably vinyl acetate, and wherein the remaining amount of vinyl ester may be any other known vinyl ester, wherein preferably at least 60, more preferably at least 70, even more preferably at least 80, even more preferably at least 90 weight percent, and most preferably essentially only (i.e. about 100 wt. % or even 100 wt. %) vinyl acetate is employed as vinyl ester (weight percent being based on the total weight of vinyl ester monomers B1 being employed).

Embodiment 5

The detergent composition according to any of embodiments 1 to 4, wherein the graft polymer is essentially free of monomer (B2).

Embodiment 6

The detergent composition according to any of embodiments 1 to 5, wherein the biodegradability of the graft polymer is at least 30, preferably at least 35, even more preferably at least 40% within 28 days when tested under OECD301F.

Embodiment 7

The detergent composition according to embodiment 1 to 6, wherein the product is a composition in the form of a liquid, a gel, a powder, a hydrocolloid, an aqueous solution, a granule, a tablet, a capsule, a single compartment sachet, a pad, a multi-compartment sachet, a single compartment pouch, or a multi-compartment pouch.

Embodiment 8

The detergent composition of embodiment 1 to 7, wherein the product is a composition that further comprises an ingredient selected from: an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

EXAMPLES

Polymer Measurements:

K-value measures the relative viscosity of dilute polymer solutions and is a relative measure of the average molecular weight. As the average molecular weight of the polymer increases for a particular polymer, the K-value tends to also increase. The K-value is determined in a 3% by weight NaCl solution at 23° C. and a polymer concentration of 1% polymer according to the method of H. Fikentscher in "Cellulosechemie", 1932, 13, 58.

The number average molecular weight (Mn), the weight average molecular weight (Mw) and the polydispersity Mw/Mn of the inventive graft polymers were determined by gel permeation chromatography in tetrahydrofuran. The mobile phase (eluent) used was tetrahydrofuran comprising 0.035 mol/L diethanolamine. The concentration of graft polymer in tetrahydrofuran was 2.0 mg per mL. After filtration (pore size 0.2 μm), 100 μL of this solution were injected into the GPC system. Four different columns (heated to 60° C.) were used for separation (SDV precolumn, SDV 1000A, SDV 100000A, SDV 1000000A). The GPC system was operated at a flow rate of 1 mL per min. A DRI Agilent 1100 was used as the detection system. Poly (ethylene glycol) (PEG) standards (PL) having a molecular weight Mn from 106 to 1 378 000 g/mol were used for the calibration.

Synthesis Procedures for Inventive Polymers Example 1-7

Inventive Polymer 1: Graft Polymerization of Vinyl Acetate (50 wt. %) on PEG (Mn 600 g/Mol; 50 Wt %)

A polymerization vessel equipped with stirrer and reflux condenser was initially charged with 500 g of PEG under nitrogen atmosphere and heated to 90° C.

Feed 1 containing 3.57 g of tert-butyl peroxy-2-ethylhexanoate, dissolved in 29.86 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (500 g of vinyl acetate) was started and dosed to the reaction vessel within 6:00 h at constant feed rate and 90° C. Upon completion of the feeds, Feed 3 consisting of 4.90 g of tert-butyl peroxy-2-ethylhexanoate, dissolved in 40.12 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Inventive Polymer 2: Graft Polymerization of Vinyl Acetate (30 wt. %) on PEG (Mn 600 g/Mol; 70 Wt %)

A polymerization vessel equipped with stirrer and reflux condenser was initially charged with 700 g of PEG under nitrogen atmosphere and heated to 90° C.

Feed 1 containing 10.20 g of tert-butyl peroxy-2-ethylhexanoate, dissolved in 47.61 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (300 g of vinyl acetate) was started and dosed to the reaction vessel within 6:00 h at constant feed rate and 90° C. Upon completion of the feeds, Feed 3 consisting of 4.90 g of tert-butyl peroxy-2-ethylhexanoate, dissolved in 22.39 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Inventive Polymer 3: Graft Polymerization of Vinyl Acetate (30 wt. %) on PEG (Mn 1500 g/Mol; 70 wt %)

A polymerization vessel equipped with stirrer and reflux condenser was initially charged with 595 g of PEG under nitrogen atmosphere and melted at 90° C.

Feed 1 containing 10.41 g of tert-butyl peroxy-2-ethylhexanoate, dissolved in 42.76 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (255 g of vinyl acetate) was started and dosed to the reaction vessel within 6:00 h at constant feed rate and 90° C. Upon completion of the feeds, Feed 3 consisting of 4.16 g of tert-butyl peroxy-2-ethylhexanoate, dissolved in 16.75 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Inventive Polymer 4: Graft Polymerization of Vinyl Acetate (25 wt. %) on PEG (Mn 1500 g/Mol; 75 wt %)

A polymerization vessel equipped with stirrer and reflux condenser was initially charged with 750 g of PEG under nitrogen atmosphere and melted at 90° C.

Feed 1 containing 3.57 g of tert-butyl peroxy-2-ethylhexanoate, dissolved in 29.86 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (250 g of vinyl acetate) was started and dosed to the reaction vessel within 6:00 h at constant feed rate and 90° C. Upon completion of the feeds, Feed 3 consisting of 4.90 g of tert-butyl peroxy-2-ethylhexanoate, dissolved in 40.12 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Inventive Polymer 5: Graft Polymerization of Vinyl Acetate (20 wt. %) on PEG (Mn 1500 g/Mol; 80 wt %)

A polymerization vessel equipped with stirrer and reflux condenser was initially charged with 800 g of PEG under nitrogen atmosphere and melted at 90° C.

Feed 1 containing 3.57 g of tert-butyl peroxy-2-ethylhexanoate, dissolved in 29.86 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (200 g of vinyl acetate) was started and dosed to the reaction vessel within 6:00 h at constant feed rate and 90° C. Upon completion of the feeds, Feed 3 consisting of 4.90 g of tert-butyl peroxy-2-ethylhexanoate, dissolved in 40.12 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Inventive Polymer 6: Graft Polymerization of Vinyl Acetate (15 wt. %) on PEG (Mn 1500 g/Mol; 85 wt %)

A polymerization vessel equipped with stirrer and reflux condenser was initially charged with 850 g of PEG under nitrogen atmosphere and melted at 90° C.

Feed 1 containing 3.57 g of tert-butyl peroxy-2-ethylhexanoate, dissolved in 29.86 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (150 g of vinyl acetate) was started and dosed to the reaction vessel within 6:00 h at constant feed rate and 90° C. Upon completion of the feeds, Feed 3 consisting of 4.90 g of tert-butyl peroxy-2-ethylhexanoate, dissolved in 41.00 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Inventive Polymer 7: Graft Polymerization of Vinyl Acetate (20 wt. %) and Vinyl Laurate (5 wt. %) on PEG (Mn 1500 g/Mol; 75 wt %)

A polymerization vessel equipped with stirrer and reflux condenser was initially charged with 750 g of PEG under nitrogen atmosphere and melted at 90° C.

Feed 1 containing 3.57 g of tert-butyl peroxy-2-ethylhexanoate, dissolved in 29.50 g of tripropylene glycol, was dosed to the stirred vessel in 6:10 h, at 90° C. 5.56% of Feed 1 were dosed in the first 10 min and the rest was dosed with constant feed rate for 6:00 h. 10 minutes after the start of Feed 1, Feed 2 (200 g of vinyl acetate) and Feed 3 (50 g of vinyl laurate) were started and dosed to the reaction vessel within 6:00 h at constant feed rate and 90° C. Upon completion of the feeds, Feed 4 consisting of 4.90 g of tert-butyl peroxy-2-ethylhexanoate, dissolved in 40.48 g of tripropylene glycol, were dosed within 56 min with constant flow rate at 90° C. The mixture was stirred for one hour at 90° C. upon complete addition of the feed.

Residual amounts of monomer were removed by vacuum distillation for 1 h at 95° C. and 500 mbar.

Synthesis Procedures for Comparative Polymers Comp Ex. 1-Comp Ex. 4

Comparative Polymer 1: Graft Polymerization of Vinyl Acetate (40 wt. %) on PEG (Mn 6000 g/Mol; 60 wt. %)

A polymerization vessel equipped with stirrer and reflux condenser was initially charged with 660 g of PEG (Mn 6000 g/mol) under nitrogen atmosphere and melted at 90° C. Feed 1 containing 4.42 g of tert-butyl peroxy-2-ethylhexanoate, dissolved in 35.09 g of 1,2-propanediol, was dosed to the stirred vessel in 6:10 h, at 90° C. 5.56 wt.-% of Feed 1 were dosed in the first 10 min and the rest was dosed with constant feed rate for 6:00 h. 10 minutes after the start of Feed 1, Feed 2 (440 g of vinyl acetate) was started and dosed within 6:00 h at constant feed rate and 90° C. Upon completion of the Feeds 1 and 2, the temperature was increased to 95° C. and Feed 3 consisting of 2.81 g of tert-butyl peroxy-2-ethylhexanoate, dissolved in 23.21 g of 1,2-propanediol, were dosed within 56 min with constant flow rate at 95° C. The mixture was stirred for one hour at 95° C. upon complete addition of the feed. Residual amounts of monomer were removed by vacuum distillation for 1 h at 95° C. and 500 mbar.

Comparative Polymer 2: Graft Polymerization of Vinyl Acetate (30 wt. %) on PEG (Mn 6000 g/mol; 70 wt. %)

A polymerization vessel equipped with stirrer and reflux condenser was initially charged with 700 g of PEG (Mn 6000 g/mol) under nitrogen atmosphere and melted at 90° C. Feed 1 containing 12.24 g of tert-butyl peroxy-2-ethylhexanoate, dissolved in 50.30 g of tripropylene glycol, was dosed to the stirred vessel in 6:10 h, at 90° C. 5.56 wt.-% of Feed 1 were dosed in the first 10 min and the rest was dosed with constant feed rate for 6:00 h. 10 minutes after the start of Feed 1, Feed 2 (300 g of vinyl acetate) was started and dosed within 6:00 h at constant feed rate and 90° C. Upon completion of the Feeds 1 and 2, the temperature was increased to 95° C. and Feed 3 consisting of 4.80 g of tert-butyl peroxy-2-ethylhexanoate, dissolved in 19.70 g of tripropylene glycol, were dosed within 56 min with constant flow rate at 95° C. The mixture was stirred for one hour at 95° C. upon complete addition of the feed. Residual amounts of monomer were removed by vacuum distillation for 1 h at 95° C. and 500 mbar.

Comparative Polymer 3: Graft Polymerization of Vinyl Acetate (40 wt. %) on PEG (Mn 4000 g/Mol; 60 wt. %)

A polymerization vessel equipped with stirrer and reflux condenser was initially charged with 600 g of PEG (Mn 4000 g/mol) under nitrogen atmosphere and melted at 90° C. Feed 1 containing 3.57 g of tert-butyl peroxy-2-ethylhexanoate, dissolved in 29.90 g of tripropylene glycol, was dosed to the stirred vessel in 6:10 h, at 90° C. 5.56 wt.-% of Feed 1 were dosed in the first 10 min and the rest was dosed with constant feed rate for 6:00 h. 10 minutes after the start of Feed 1, Feed 2 (400 g of vinyl acetate) was started and dosed within 6:00 h at constant feed rate and 90° C. Upon completion of the Feeds 1 and 2, the temperature was increased to 95° C. and Feed 3 consisting of 4.90 g of tert-butyl peroxy-2-ethylhexanoate, dissolved in 41.00 g of tripropylene glycol, were dosed within 56 min with constant flow rate at 95° C. The mixture was stirred for one hour at 95° C. upon complete addition of the feed. Residual amounts of monomer were removed by vacuum distillation for 1 h at 95° C. and 500 mbar.

Comparative Polymer 4: Graft Polymerization of Vinyl Acetate (60 wt. %) on PEG (Mn 6000 g/mol; 40 wt. %)

A polymerization vessel equipped with stirrer and reflux condenser was initially charged with 400 g of PEG (Mn 6000 g/mol) under nitrogen atmosphere and melted at 90° C. Feed 1 containing 4.8 g of tert-butyl peroxy-2-ethylhexanoate, dissolved in 23.6 g of tripropylene glycol, was dosed to the stirred vessel in 6:10 h, at 90° C. 5.56 wt.-% of Feed 1 were dosed in the first 10 min and the rest was dosed with constant feed rate for 6:00 h. 10 minutes after the start of Feed 1, Feed 2 (600 g of vinyl acetate) was started and dosed within 6:00 h at constant feed rate and 90° C. Upon completion of the Feeds 1 and 2, the temperature was increased to 95° C. and Feed 3 consisting of 3.16 g of tert-butyl peroxy-2-ethylhexanoate, dissolved in 15.70 g of tripropylene glycol, were dosed within 56 min with constant flow rate at 95° C. The mixture was stirred for one hour at 95° C. upon complete addition of the feed. Residual amounts of monomer were removed by vacuum distillation for 1 h at 95° C. and 500 mbar.

Polymer Biodegradability

Polymer biodegradation in wastewater was tested in triplicate using the OECD 301F manometric respirometry method. 30 mg/mL test substance is inoculated into wastewater taken from Mannheim Wastewater Treatment Plant and incubated in a closed flask at 25° C. for 28 days. The consumption of oxygen during this time is measured as the change in pressure inside the flask using an OxiTop C (WTW). Evolved $CO_2$ is absorbed using an NaOH solution. The amount of oxygen consumed by the microbial population during biodegradation of the test substance, after correction using a blank, is expressed as a % of the ThOD (Theoretical Oxygen Demand).

The biodegradation data of inventive and comparative polymers at 28 day of the OECD 301F test is summarized in Table 5. It is clear that inventive graft polymers show much higher biodegradability than comparative polymers.

TABLE 5

Structure and biodegradability of Inventive and Comparative graft polymers

| | Backbone (PEG) | Side chain monomer type (wt % *) | P | Biodegradability (%, 28 day) |
|---|---|---|---|---|
| Inventive polymer 1 | Mn = 600 | VAc (50) | 300 | 54 |
| Inventive polymer 2 | Mn = 600 | VAc (30) | 180 | 64 |
| Inventive polymer 3 | Mn = 1500 | VAc (30) | 450 | 47 |
| Inventive polymer 4 | Mn = 1500 | VAc (25) | 375 | 61 |
| Inventive polymer 5 | Mn = 1500 | VAc (20) | 300 | 65 |
| Inventive polymer 6 | Mn = 1500 | VAc (15) | 225 | 72 |
| Inventive polymer 7 | Mn = 1500 | VAc (20)/ VLa (5) | 375 | 59 |
| Comparative polymer 1 | Mn = 6000 | VAc (40) | 2400 | 15 |
| Comparative polymer 2 | Mn = 6000 | VAc (30) | 1800 | 15 |
| Comparative polymer 3 | Mn = 4000 | VAc (40) | 1600 | 38 |
| Comparative polymer 4 | Mn = 6000 | VAc (60) | 3600 | 28 |

P = [molecular weight of the polymer backbone Mn in g/mol] × [percentage of grafting of polymeric sidechains (B) based on total polymer weight with polymer weight being set to "1" and the percentage of grafting as fractions thereof]
* weight percent of polymeric sidechains in relation to the total weight of the graft polymer
VAc: vinyl acetate;
VLa: vinyl laurate Method for Evaluating Whiteness Benefit of Polymers Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed.

The whiteness benefit of polymers of the present disclosure is evaluated using automatic Tergotometer with 10 pots for laundry formulation testing.

SBL2004 test soil strips supplied by WFK Testgewebe GmbH are used to simulate consumer soil levels (mix of body soil, food, dirt etc.). On average, every 1 SBL2004 strip is loaded with 8 g soil. The SBL2004 test soil strips were cut into 5x5 cm squares for use in the test. For some conditions, 0.02 g carbon black supplied by Alfa Aesar is added. Carbon black was mixed with 5 ml of water and placed in ultrasonic bath for 15 min before addition.

White Fabric swatches of Table 6 below purchased from WFK Testgewebe GmbH are used as whiteness tracers.

TABLE 6

| Code | Fiber Content | % Fiber Content | Fabric Construction | Size | WFK Code |
|---|---|---|---|---|---|
| CK | Cotton | 100 | Weft Knit | (5 × 5 cm) | 19502_5x5_stamped |
| PC | Polyester/cotton | 65/35 | Weave | (5 × 5 cm) | 19503_5x5_stamped |
| PE | Polyester | 100 | Weft Knit | (5 × 5 cm) | 19508_5x5_stamped |
| PS | Polyester/Spandex ™ | 95/5 | Weft Knit | (5 × 5 cm) | 19507_5x5_stamped |

Additional ballast (background fabric swatches) are also used to simulate a fabric load and provide mechanical energy during the real laundry process. Ballast loads are comprised of cotton and polycotton knit swatches at 5×5 cm size. 4 cycles of wash are needed to complete the test:

Cycle 1: Desired amount of detergent is fully dissolved by mixing with 1 L water (at defined hardness) in each tergotometer port. 60 grams of fabrics, including whiteness tracers (4 types, each with 4 replicates), 21 pieces 5×5 cm SBL2004, and ballast are washed and rinsed in the tergotometer pot under defined conditions.

In the test of water-soluble unit dose composition, wash concentration is 2000 ppm. Additional 47 ppm PVOH film is also added to the tergotometer pot. The wash temperature is 30° C., water hardness is 20 gpg.

Cycle 2: The whiteness tracers and ballast from each pot are then washed and rinsed again together with a new set of SBL2004 (5×5 cm, 21 pieces) follow the process of cycle 1. All other conditions remain same as cycle 1.

Cycle 3: The whiteness tracers and ballast from each pot are then washed and rinsed again together with a new set of SBL2004 (5×5 cm, 21 pieces) follow the process of cycle 1. All other conditions remain same as cycle 1.

Cycle 4: The whiteness tracers and ballast from each port are then washed and rinsed again together with a new set of SBL2004 (5×5 cm, 21 pieces) follow the process of cycle 1. All other conditions remain same as cycle 1.

For some test conditions, 0.02 g carbon black supplied by Alfa Aesar is added in addition to the 21 pieces of SBL in every wash cycle as mentioned above.

After Cycle 4, all whiteness tracers & ballast are tumbled dried between 60-65° C. until dry, then WI(CIE) of the dry tracers is measured using Konica Minolta CM-3610D spectrophotometer.

When carbon black is used for some test conditions, whiteness tracers are dried in airflow cabinet.

Method for Evaluating Cleaning Benefit of Polymers

Cleaning benefit of polymers are evaluated using tergotometer. Some example test stains suitable for this test are:

Standard Grass ex Equest
Standard Black Todd Clay ex Equest
ASTM Dust Sebum ex CFT
Highly Discriminating Sebum on polycotton ex CFT
Burnt Butter on Knitted cotton ex Equest
Dyed Bacon on Knitted Cotton ex Equest The stains are analyzed using commercially available image analysis system for L, a, b values.

Inventive polymer is typically formulated into a finished product together with other ingredients for test. Wash solution is prepared by diluting test product with water (at defined hardness) to a defined wash concentration.

In the test of water-soluble unit dose composition, additional 47 ppm PVOH film is also added to the tergotometer pot. The wash temperature is 30° C., and water hardness is 8 gpg. The fabrics to be washed in each tergotometer pot include 2 pieces of each test stain (2 internal replicates), 13 swatches of 5×5 cm WfK SBL 2004 soil sheets, and additional knitted cotton ballast to make the total fabric weight up to 60 g.

Once all the fabrics are added into tergotometer pot containing wash solution, the wash solution is agitated for 40 minutes. The wash solutions are then drained, and the fabrics are subject to 5 minute rinse steps once or twice before being drained and spun dry. The washed stains are dried in an airflow cabinet, then analyzed using commercially available image analysis system for L, a, b values.

This procedure is repeated further to give a total of 3-4 external replicates.

Stain Removal Index (SRI) are calculated from the L, a, b values using the formula shown below.

The higher the SRI, the better the stain removal.

$$SRI=100*((\Delta E_b-\Delta E_a)/\Delta E_b)$$

$$\Delta E_b=\surd((L_c-L_b)^2+(a_c-a_b)^2+(b_c-b_b)^2)$$

$$\Delta E_a=\surd((L_c-L_a)^2+(a_c-a_a)^2+(b_c-b_a)^2)$$

Subscript 'b' denotes data for the stain before washing

Subscript 'a' denotes data for the stain after washing

Subscript 'c' denotes data for the unstained fabric

Polymer Whiteness and Cleaning Performance in Liquid Detergent

Water soluble unit dose detergent composition E and F below are prepared by traditional means known to those of ordinary skill in the art by mixing the listed ingredients (Table 7).

The whiteness maintenance of the inventive polymers is evaluated according to the method for evaluating whiteness performance of polymers by directly comparing the whiteness performance of reference composition E and test composition F. ΔWI(CIE) of composition F vs composition E is reported in Table 8 as an indication of polymer whiteness performance benefit. ΔSRI of composition F vs Reference composition E is reported in Table 9 as an indication of polymer cleaning performance.

TABLE 7

| Ingredients | E (Reference composition) | F (Test composition: reference composition + Inventive polymer) |
|---|---|---|
| LAS (wt %) | 23.29 | 23.29 |
| AES (wt %) | 11.99 | 11.99 |
| AE NI (wt %) | 1.92 | 1.92 |
| Suds Suppressor (wt %) | 0.25 | 0.25 |
| Polymer Example (wt %) | 0.00 | 5.53 |
| DTPA (wt %) | 0.49 | 0.49 |
| HEDP (wt %) | 2.12 | 2.12 |
| Monoethanolamine (wt %) | 7.68 | 7.68 |
| 1,2 PropaneDiol (wt %) | 8.52 | 8.52 |
| DiPropyleneGlycol (wt %) | 1.53 | 1.53 |
| Sodium Bisulphite (wt %) | 0.17 | 0.17 |
| $K_2SO_3$ (wt %) | 0.37 | 0.37 |
| $MgCl_2$ (wt %) | 0.30 | 0.30 |
| Citric Acid (wt %) | 0.66 | 0.66 |
| Fatty Acid (wt %) | 1.53 | 1.53 |
| Glycerine (wt %) | 4.49 | 4.49 |
| Brightener (wt %) | 0.37 | 0.37 |
| Blue dye (wt %) | 0.0059 | 0.0059 |
| Enzyme (including Protease, Amylase, and Mannanase) (wt %) | 0.0657 | 0.0657 |
| Preservative (wt %) | 0.009 | 0.009 |
| Hydrogenated castor oil (wt %) | 0.09 | 0.09 |
| Perfume (wt %) | 2.17 | 2.17 |

TABLE 7-continued

| Ingredients | E (Reference composition) | F (Test composition: reference composition + Inventive polymer) |
|---|---|---|
| Hueing Dye (wt %) | 0.053 | 0.053 |
| Water/minors (wt %) | Balance | Balance |

As shown in Table 8, inventive polymer delivers significant whiteness benefit in liquid laundry detergent.

TABLE 8

| Inventive polymer | Backbone (PEG) | Side chain monomer type (wt % *) | ΔWI(CIE) vs Reference [a] |
|---|---|---|---|
| 1 | Mn = 600 | VAc (50) | 8.2 |
| 2 | Mn = 600 | VAc (30) | 2.2 |
| 3 | Mn = 1500 | VAc (30) | 3.1 |
| 5 | Mn = 1500 | VAc (20) | 2.0 |
| 7 | Mn = 1500 | VAc (20)/VLa (5) | 9.2 |

[a] Fabric: 100% Polyester Knit (PE). Soil condition: SBL with additional carbon black

* weight percent of polymeric sidechains in relation to the total weight of the graft polymer As shown in Table 9, the inventive polymer delivers significant cleaning benefit in liquid laundry detergent, especially on sebum stains.

TABLE 9

| Inventive polymer | Backbone (PEG) | Side chain monomer type (wt % *) | ΔSRI vs Reference [a] |
|---|---|---|---|
| 1 | Mn = 600 | VAc (50) | +4.5 |
| 2 | Mn = 600 | VAc (30) | +3.3 |
| 3 | Mn = 1500 | VAc (30) | +9.5 |
| 5 | Mn = 1500 | VAc (20) | +9.5 |

[a] Highly Discriminating Sebum on polycotton ex CFT

* weight percent of polymeric sidechains in relation to the total weight of the graft polymer The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A detergent composition comprising a detersive surfactant and a graft polymer comprising:

(A) about 20 to about 95 wt %, by weight of the polymer, of a polymer backbone as a graft base, which is obtainable by polymerization of ethylene oxide, wherein the number average molecular weight of the polymer backbone in g/mol is within about 500 to about 5000; and (B) about 5 to about 80 wt %, by weight of the polymer, of polymeric sidechains grafted onto the polymer backbone, wherein said polymeric sidechains are obtainable by polymerization of at least one vinyl ester monomer, and optionally at least one other monomer, wherein—if present—the weight ratio of the at least one other monomer to the at least one vinyl ester monomer is less than about 0.5, wherein the at least one other monomer is not N-vinylpyrrolidone and wherein the graft polymer has value P=[molecular weight of the polymer backbone Mn in g/mol]×[percentage of amount of polymeric sidechains based on total polymer weight, with polymer weight being set to "1" and the percentage of amount of polymeric sidechains as fraction thereof] of 50 to 300;

wherein more than 0 and up to 60% of the polymeric sidechains are fully and/or partially hydrolyzed.

2. The detergent composition according to claim 1, wherein:

i) the polymer backbone may be bare as the two end-groups or the one or two hydroxy-groups may be capped on one end or both ends with C1 to C22-alkyl groups; and/or ii) the graft polymer has a polydispersity of weight average molecular weight/number average molecular weight of <about 5; and/or iii) no at least one other monomer is employed for the polymerization to obtain the side chains.

3. The detergent composition according to claim 1, wherein at least about 10 weight percent of the total amount of vinyl ester monomer is selected from vinyl acetate, vinyl propionate and vinyl laurate, and wherein the remaining amount of vinyl ester may be any other known vinyl ester.

4. The detergent composition according to claim 1, wherein the biodegradability of the graft polymer is at least about 30 within 28 days when tested under OECD301F.

5. The detergent composition according to claim 1, wherein the product is a composition in the form of a liquid, a gel, a powder, a hydrocolloid, an aqueous solution, a granule, a tablet, a capsule, a single compartment sachet, a pad, a multi-compartment sachet, a single compartment pouch, or a multi-compartment pouch.

6. The detergent composition according to claim 1, wherein the product is a composition that further comprises an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

7. The detergent composition according to claim 2, wherein the polymer backbone may be bare as the two end-groups or the one or two hydroxy-groups or may be capped on one end or both ends with C1 to C4-alkyl groups.

8. The detergent composition according to claim 1, wherein the polymer contains only vinyl ester sidechains.

9. A detergent composition comprising:

i) from about 1% to about 70% of a detersive surfactant, by weight of the composition; and ii) a graft polymer, wherein the graft polymer comprises:

a) from about 50% to about 95%, by weight of the polymer, an ethylene oxide polymer backbone (A) as a graft base having a number average molecular weight of about 500 to about 1800 g/mol, and b) from about 5% to about 50%, by weight of the polymer of a polymeric side chain grafted onto the ethylene oxide polymer backbone, wherein said polymeric sidechains are obtainable by polymerization of at least one vinyl ester monomer, and optionally at least one other monomer, wherein—if present—the weight ratio of the at least one other monomer to the at least one vinyl ester monomer is less than about 0.5 and the at least one other monomer is not N-vinylpyrrolidone;

wherein the polymer has value P=[molecular weight of the polymer backbone Mn in g/mol]×[percentage of amount of polymeric sidechains based on total polymer weight, with polymer weight being set to "1" and the percentage of amount of polymeric sidechains as fraction thereof] of 50 to 1500.

10. The detergent composition of claim 9, wherein the graft polymer has a polydispersity of weight average molecular weight/number average molecular weight of <about 5.

11. The detergent composition of claim 9, wherein the polymer has value P=[molecular weight of the polymer backbone Mn in g/mol]×[percentage of amount of polymeric sidechains based on total polymer weight, with polymer weight being set to "1" and the percentage of amount of polymeric sidechains as fraction thereof] of 50 to 300.

* * * * *